US012247722B2

(12) United States Patent
Rade et al.

(10) Patent No.: US 12,247,722 B2
(45) Date of Patent: Mar. 11, 2025

(54) MOUNTING BRACKET

(71) Applicant: Eaton Intelligent Power Limited, Dublin (IE)

(72) Inventors: Anzar Rade, Pune (IN); Ankita Mathew, New Delhi (IN); Prince Kumar Pandey, Bihar (IN); Jayram Shivajirao Desai, Maharashtra (IN); Himanshu Gangadhar Khokle, Maharashtra (IN); Lewis T. Henderson, Syracuse, NY (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 67 days.

(21) Appl. No.: 17/452,767

(22) Filed: Oct. 28, 2021

(65) Prior Publication Data

US 2022/0136681 A1 May 5, 2022

Related U.S. Application Data

(60) Provisional application No. 63/107,544, filed on Oct. 30, 2020.

(51) Int. Cl.
*F21V 17/16* (2006.01)
*F16B 2/20* (2006.01)
(Continued)

(52) U.S. Cl.
CPC ............ *F21V 17/164* (2013.01); *F16B 2/20* (2013.01); *F21S 8/043* (2013.01); *F21V 17/12* (2013.01);
(Continued)

(58) Field of Classification Search
CPC ...... F21V 23/02; F21V 23/023; F21V 23/026; F21V 23/007; F21V 23/008; F21V 23/009; F21V 17/12; F21V 17/16; F21V 17/164; F21V 19/0035; F21V 19/004; F21V 21/088; F21S 8/043
See application file for complete search history.

(56) References Cited

U.S. PATENT DOCUMENTS

2014/0160741 A1* 6/2014 Blackstone ........... F21V 23/026
362/221
2018/0119904 A1* 5/2018 Elwell .................. B60Q 1/0088

FOREIGN PATENT DOCUMENTS

CN       105202498 A  * 12/2015 .............. F21V 17/12
CN       206669667 U  * 11/2017
(Continued)

OTHER PUBLICATIONS

Machine translation of EP 2886946 A1 retrieved from the FIT database of PE2E search. (Year: 2023).*
(Continued)

*Primary Examiner* — Colin J Cattanach
(74) *Attorney, Agent, or Firm* — Stinson LLP

(57) ABSTRACT

The present disclosure is directed to a mounting bracket for mounting a driver to a housing of a luminaire, generally comprising a base member configured for attaching the mounting bracket to the housing of the luminaire and a pair of flanges extending laterally from the base member, each flange defining a clamp portion for engaging the driver to releasably attach the driver to the mounting bracket for mounting the driver to the housing of the luminaire.

18 Claims, 34 Drawing Sheets

(51) Int. Cl.
*F21S 8/04* (2006.01)
*F21V 17/12* (2006.01)
*F21V 19/00* (2006.01)
*F21V 21/088* (2006.01)
*F21V 23/00* (2015.01)
*F21V 23/02* (2006.01)

(52) U.S. Cl.
CPC .......... *F21V 17/16* (2013.01); *F21V 19/0035* (2013.01); *F21V 19/004* (2013.01); *F21V 21/088* (2013.01); *F21V 23/007* (2013.01); *F21V 23/008* (2013.01); *F21V 23/009* (2013.01); *F21V 23/02* (2013.01); *F21V 23/023* (2013.01); *F21V 23/026* (2013.01)

(56) References Cited

FOREIGN PATENT DOCUMENTS

| | | |
|---|---|---|
| EP | 2409077 B1 | 2/2014 |
| EP | 2886946 A1 | 6/2015 |

OTHER PUBLICATIONS

Machine translation of CN 105202498 A retrieved from the FIT database of PE2E search. (Year: 2023).*
Machine translation of CN 206669667 U retrieved from the FIT database of PE2E search. (Year: 2023).*
Extended European Search Report for European Application No. 21205690.7, Mar. 28, 2022, 8 pages, München, Germany.

* cited by examiner

MOUNTING BRACKET

REFERENCE TO RELATED APPLICATIONS

This application claims priority to U.S. Provisional Patent Application No. 63/107,544, filed Oct. 30, 2020, which is hereby incorporated by reference in its entirety.

FIELD OF THE DISCLOSURE

The present disclosure generally relates to a bracket, and more particularly to a bracket for attachment to a housing of a light fixture to mount a driver to the housing.

BACKGROUND OF THE DISCLOSURE

Light fixtures are used in a variety of environments. The internal components of light fixtures often have varying configurations. In particular, the construction and location of drivers may vary within a light fixture. Referring to FIG. 1, a fragmentary portion of a conventional light fixture is shown at 1. A driver 3 is mounted to an interior surface 5 of a housing 7 of the light fixture 1 using fasteners 9 extending through fastener holes in the driver. Corresponding fastener holes (not shown) in the housing 7 receive the fasteners to secure the driver 3 to the housing. Thus, the housing 7 must be specifically constructed to attach the driver 3 by having fastener holes located specifically for attaching the driver. Therefore, a driver having a different construction will likely not be able to be safely and correctly mounted within the light fixture.

SUMMARY OF THE DISCLOSURE

In one aspect, a mounting bracket for mounting a driver to a housing of a luminaire generally comprises a base member configured for attaching the mounting bracket to the housing of the luminaire. A pair of flanges extend laterally from the base member. Each flange defines a clamp portion for engaging the driver to releasably attach the driver to the mounting bracket for mounting the driver to the housing of the luminaire.

In another aspect, a mounting bracket for mounting a driver to a housing of a luminaire generally comprises a base member configured for attaching the mounting bracket to the housing of the luminaire. A pair of flanges extending laterally from the base member. The flanges being configured for friction-fit engagement with the driver to releasably attach the driver to the mounting bracket for mounting the driver to the housing of the luminaire.

In still another aspect, a driver assembly for use in a luminaire generally comprises a mounting bracket including a base member configured for attaching the mounting bracket to a housing of the luminaire. A pair of flanges extends laterally from the base member. A driver is releasably attached to the mounting bracket by friction-fit engagement with the flanges of the mounting bracket.

DETAILED DESCRIPTION

Figure 1:
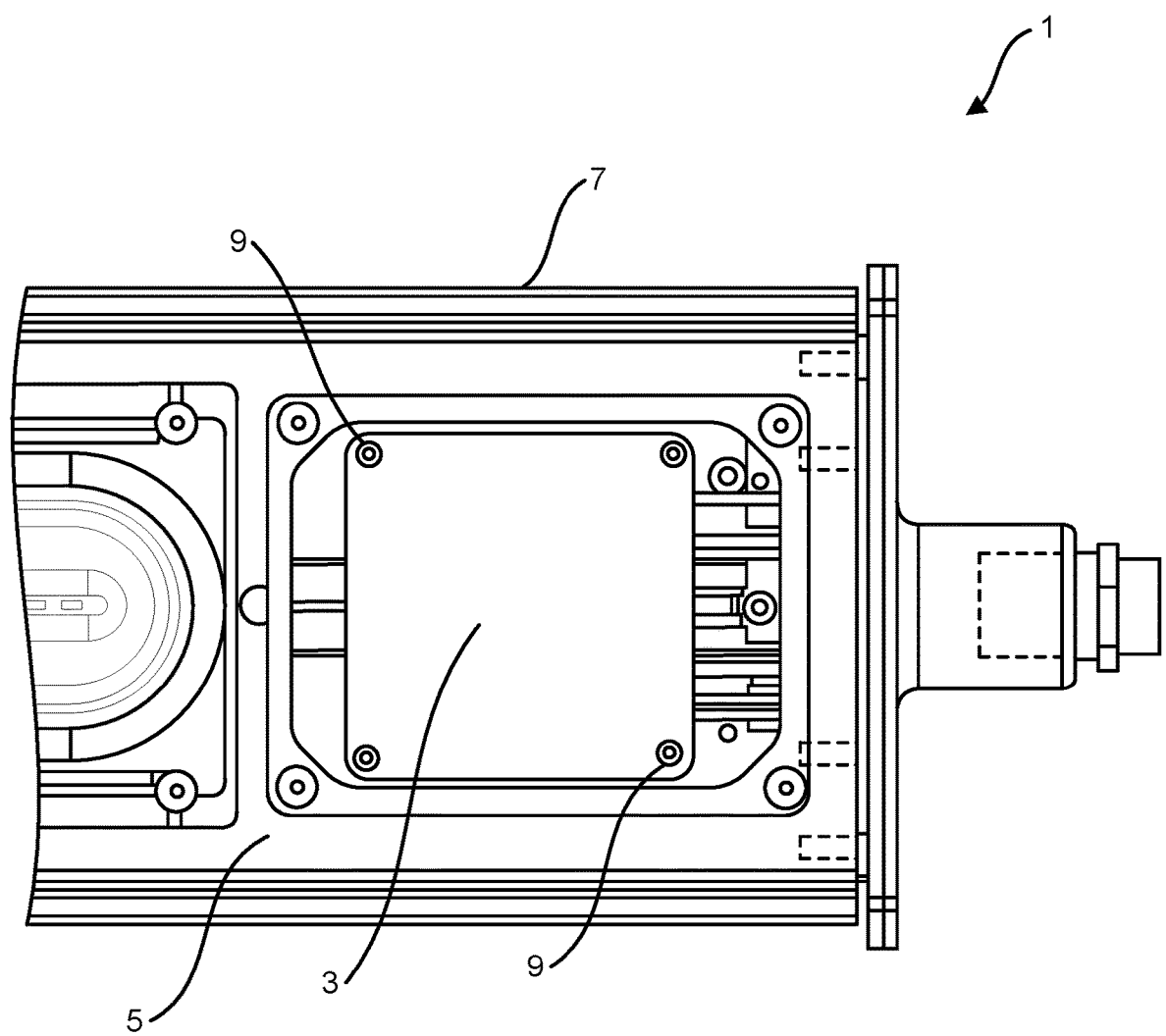
FIG. 1 is a fragmentary bottom view of a light fixture of the prior art.
Figure 2:
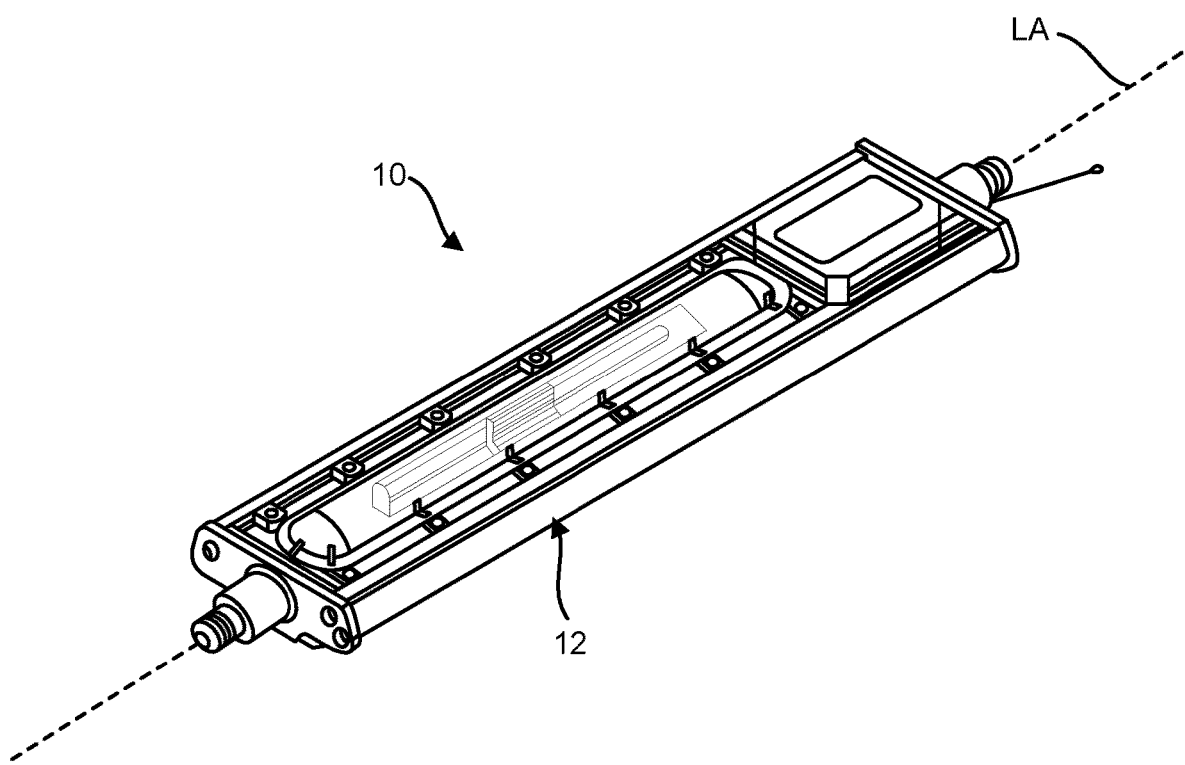
FIG. 2 is a perspective of a light fixture of the current disclosure.
Figure 3A:
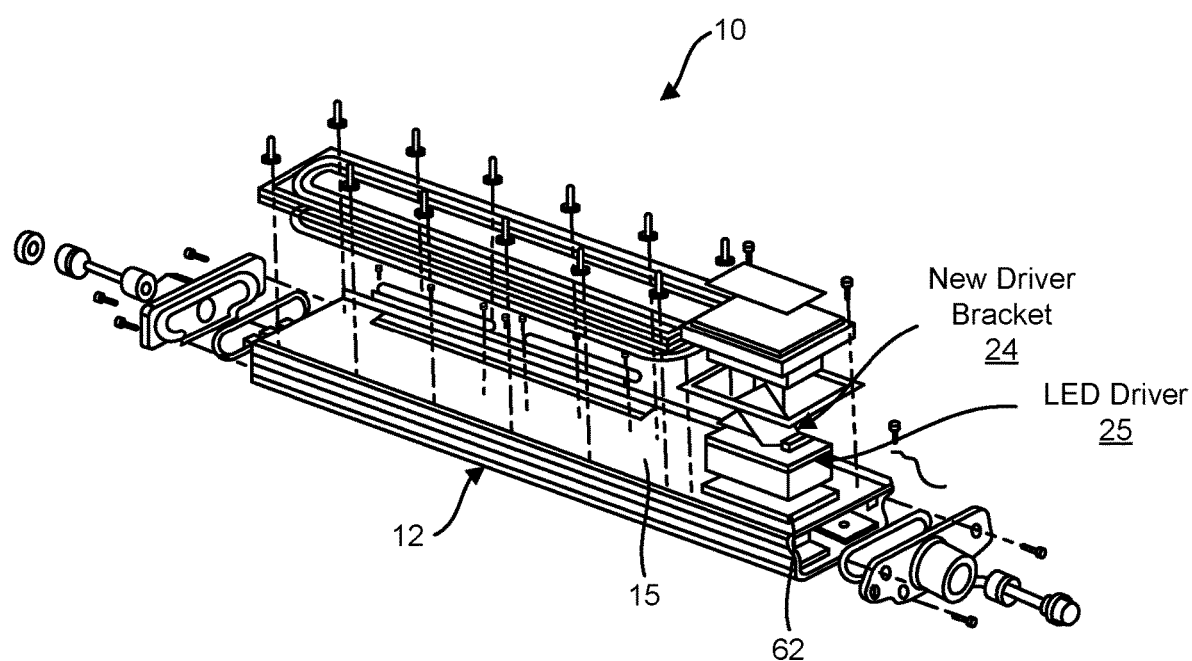
FIG. 3A is an exploded view of the light fixture.
Figure 3B:
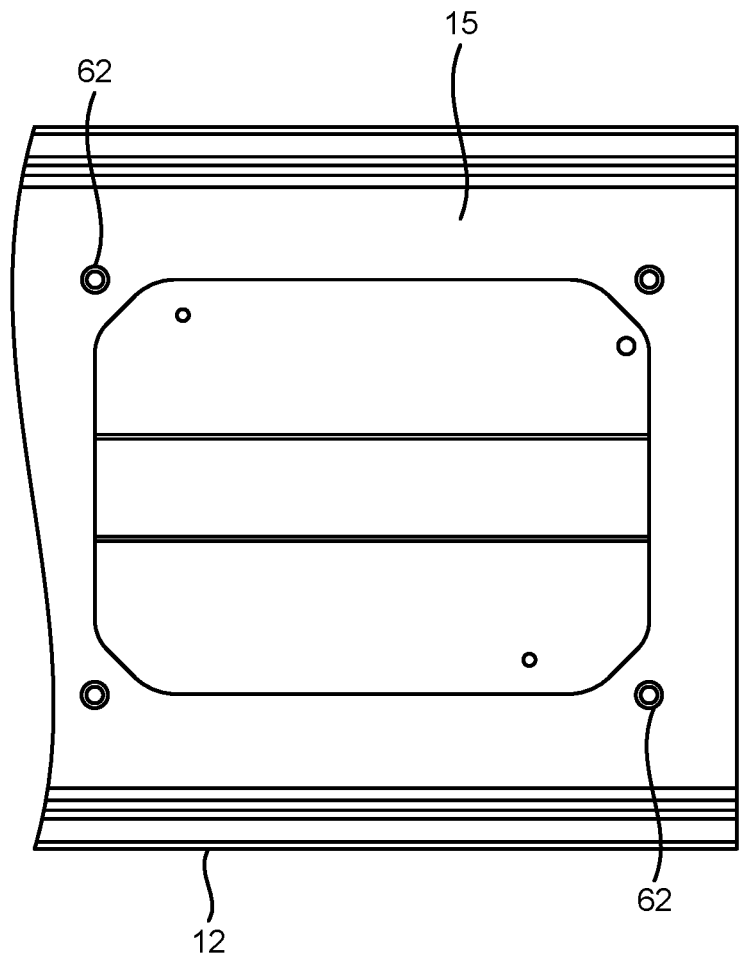
FIG. 3B is a fragmentary bottom view of the housing.

Referring to FIGS. 2-3B, a luminaire of the present disclosure is generally indicated at 10. The luminaire has a compact linear design. In one embodiment, the luminaire 10 is an LED luminaire. However, the luminaire 10 could have other configurations without departing from the scope of the disclosure. A housing 12 of the luminaire 10 houses the lighting components of the luminaire. An interior surface 15 of the housing 12 defines a surface for mounting the internal components of the luminaire 10. Further, as will be explained in greater detail below, structure is provided on the interior surface 15 for attaching internal components (e.g., driver 25) to the housing 12 in a releasable manner and for accommodating drivers of different sizes and configurations.

Referring to FIGS. 4-8, a driver assembly is configured to be disposed within the housing 12 of the luminaire 10. The driver assembly 22 comprises a mounting bracket 24 securable to the interior surface 15 of the housing 12, and a driver 25 releasably attachable to the mounting bracket to retain the driver in the housing 12. The driver 25 is electrically connected to the internal electronics in the housing 12 and configured to provide electricity to light sources (e.g., LEDs) mounted to the housing of the luminaire 10. The driver assembly 22 is secured to the interior surface 15 of the housing 12. In the illustrated embodiment, the driver assembly 22 is secured to a top, horizontally extending interior surface 15 of the housing 12. However, the driver assembly could be secured to other interior surfaces within the housing 12. Fasteners (not shown) secure the driver assembly 22 to the top interior surface 15 of the housing 12.

Referring to FIGS. 5-8, the mounting bracket 24 comprises a generally channel-shaped body including a base member 26 and flanges 28 extending laterally from the base member forming a channel 30. In the illustrated embodiment, the base member 26 comprises an elongate plate including longitudinally extending sides 32 (FIG. 7) and laterally extending edges 34 disposed at longitudinal ends of the base member. The base member 26 has a generally rectangular shape. However, the base member 26 could have other shapes without departing from the scope of the disclosure. Tabs or projections 36 are disposed at end margins of the base member 26 and extend laterally outward such that the tabs project past the longitudinal sides 32 of the base member in opposite directions. In the illustrated embodiment, a first tab 36 is disposed at one end of the base member 26 and projects in a first direction transverse to a longitudinal axis of the base member at one side of the base member, and a second tab 36 is disposed at the opposite end of the base member and projects in a second direction, opposite the first direction, and transverse to the longitudinal axis of the base member at the opposite side of the base member. The tabs 36 define fastener holes 38 for receiving fasteners (now shown) to secure the mounting bracket 24 to the interior surface 15 of the housing 12. In the illustrated embodiment, the tabs 36 have a generally trapezoidal shape. However, the tabs could have other shapes and configurations without departing from the scope of the disclosure. Additionally, the tabs 36 could be omitted such as by removing the tabs and/or by extending the flanges 28 the full length of the base member 26. In this instance, portions of the base member 26 laterally inset from the flanges 28 may define the fastener holes.

Each flange 28 extends laterally from one of the sides 32 of the base member 26. In the illustrated embodiment, each flange 28 extends generally orthogonally from the base member 26. However, the flanges 28 could extend at other angles without departing from the scope of the disclosure. Each flange 28 includes a first portion 40 extending from the base member 26. The first portion includes a bend 42 that extends directly from the side 32 of the base member 26 and curves out of plane from the base member such that a planar section 44 of the first portion extend generally orthogonally to the base member. A second portion 46 of each flange 28 extends from the first portion 40 and defines a clamp for engaging the driver 25 to hold the driver in the mounting bracket 24 as will be explained in greater detail below. The second portion 46 includes a first section 48 extending directly from the planar section 44 of the first portion 40. The first section 48 is planar and extends inward from the planar section 44 at an angle. In one embodiment, the first section 48 extends inward at about a 45-degree angle. A second section 50 of the second portion extends directly from the first section 48. The second section 50 is planar and extends generally parallel to the planar section 44 of the first portion 40. A third section 52 of the second portion extends directly form the second section 50. The third section 52 is planar and extends outward from the second section 50 at an angle. In one embodiment, the third section 52 extends outward at about a 45-degree angle. A third portion 54 of each flange 28 extends directly from the second portion 46. The third portion 54 is planar and extends generally parallel to the first portion 40. In one embodiment, the third portion 54 extends along a common axis with the first portion 40.

Figure 5:
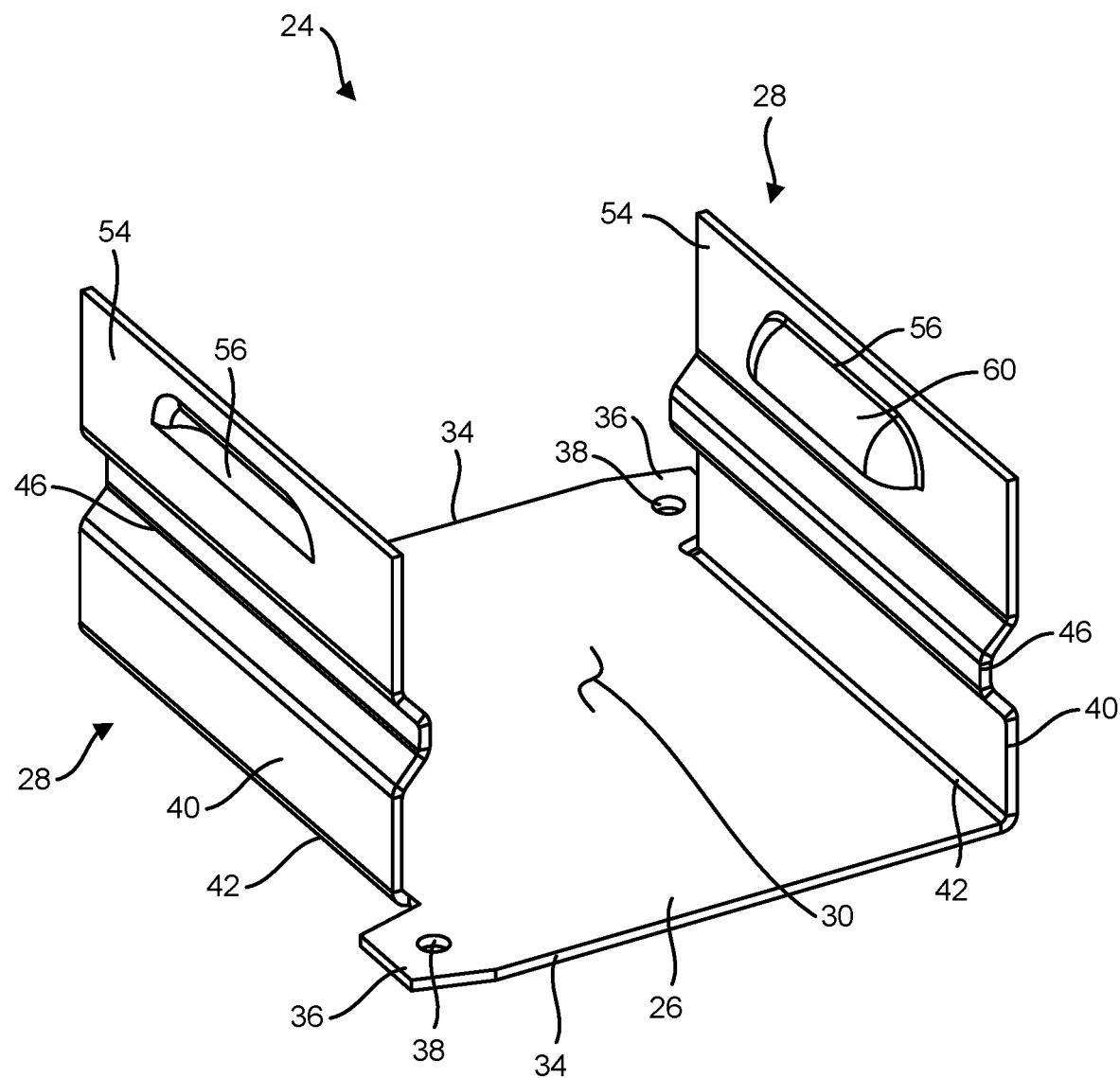
FIG. 5 is a bottom perspective of a mounting bracket of the driver assembly.
Figure 6:
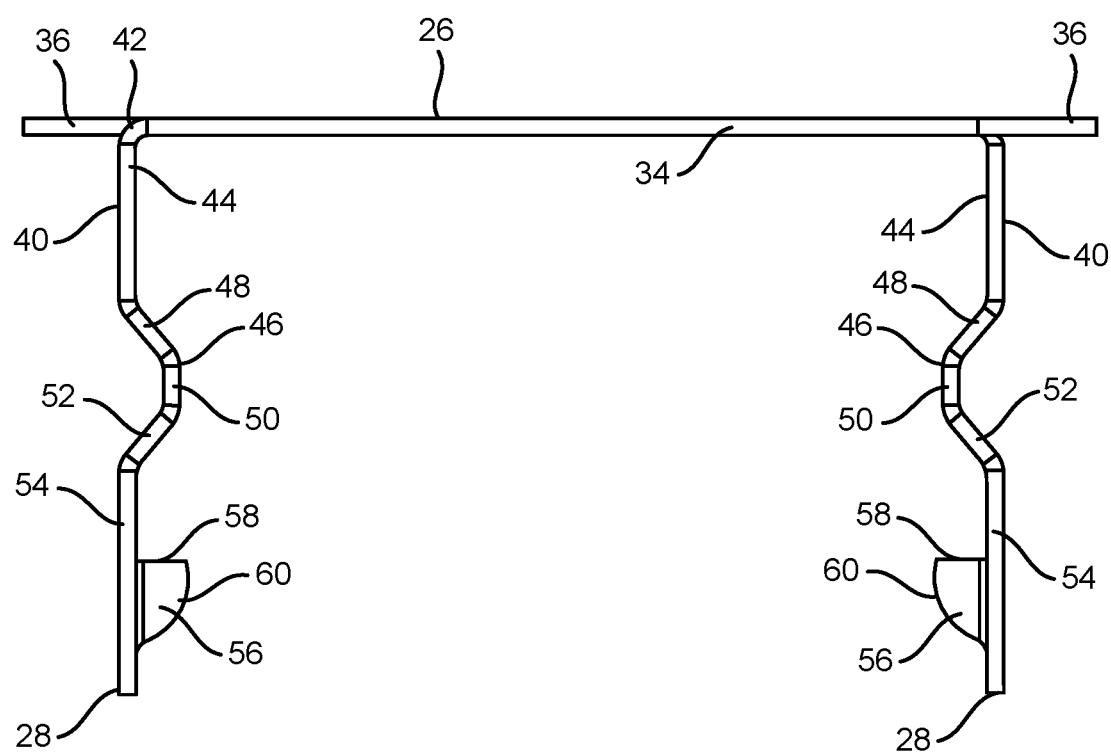
FIG. 6 is an end view of the mounting bracket.
Figure 7:
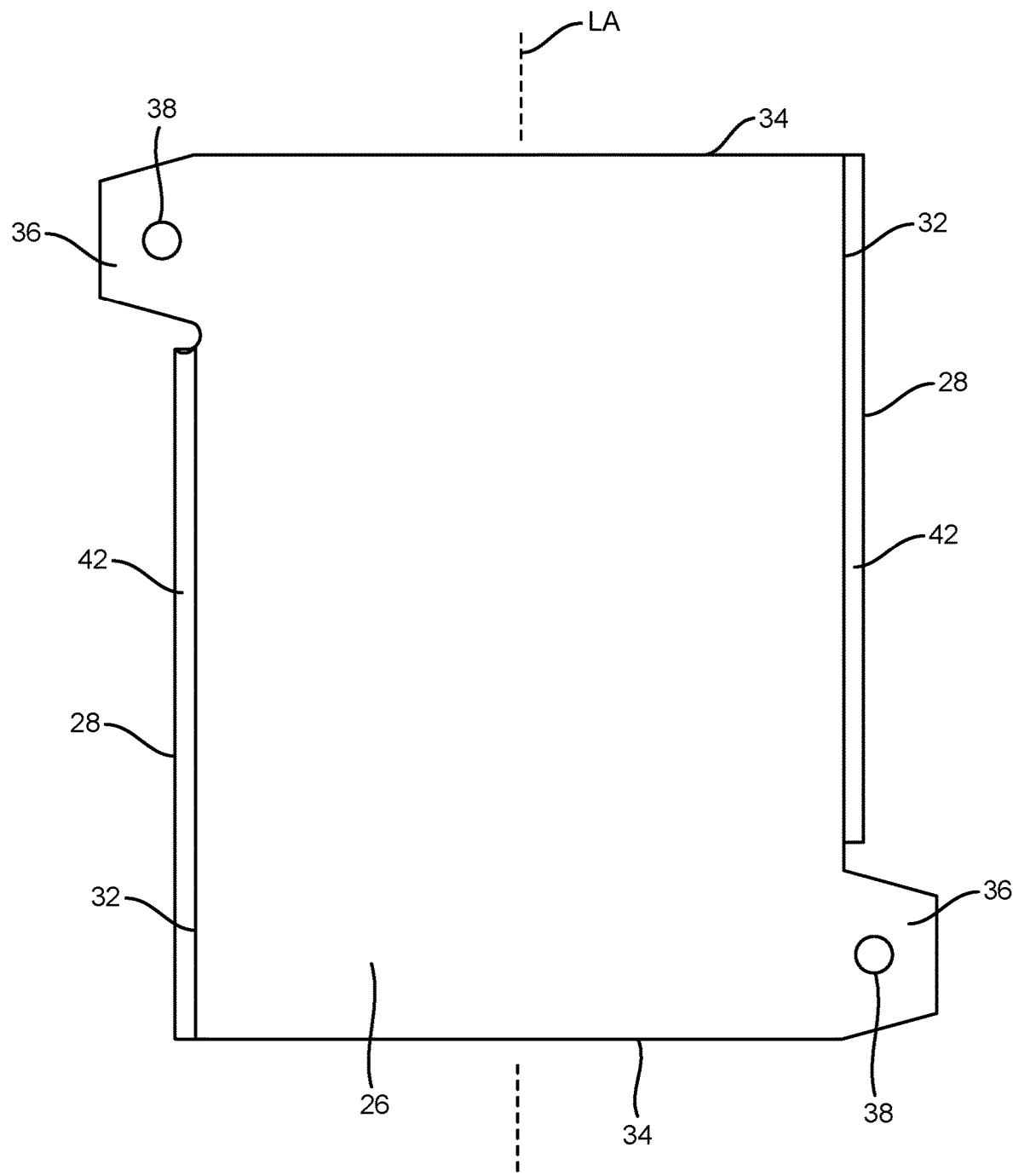
FIG. 7 is a top view of the mounting bracket.
Figure 8:
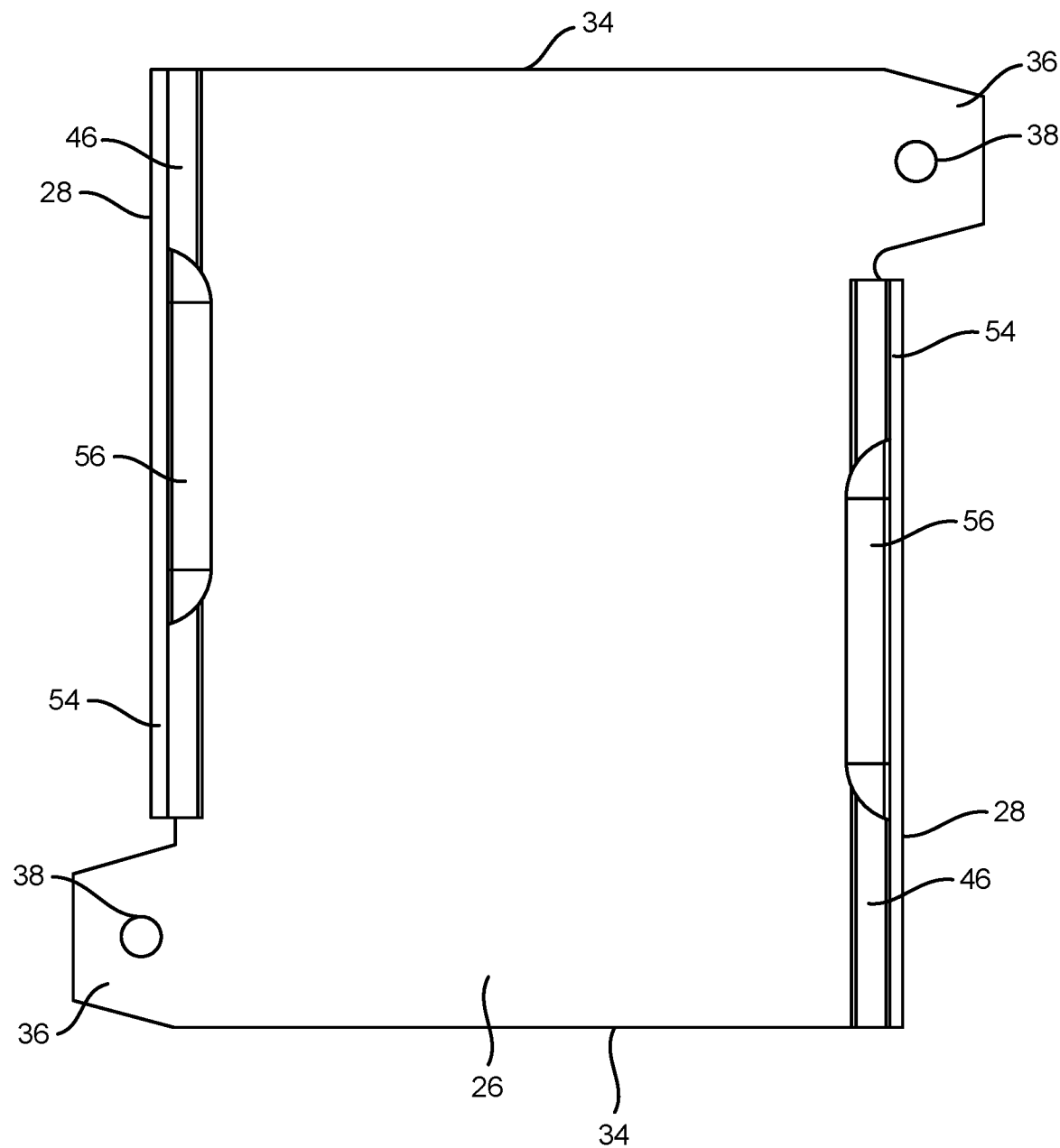
FIG. 8 is a bottom view of the mounting bracket.
Figure 9:
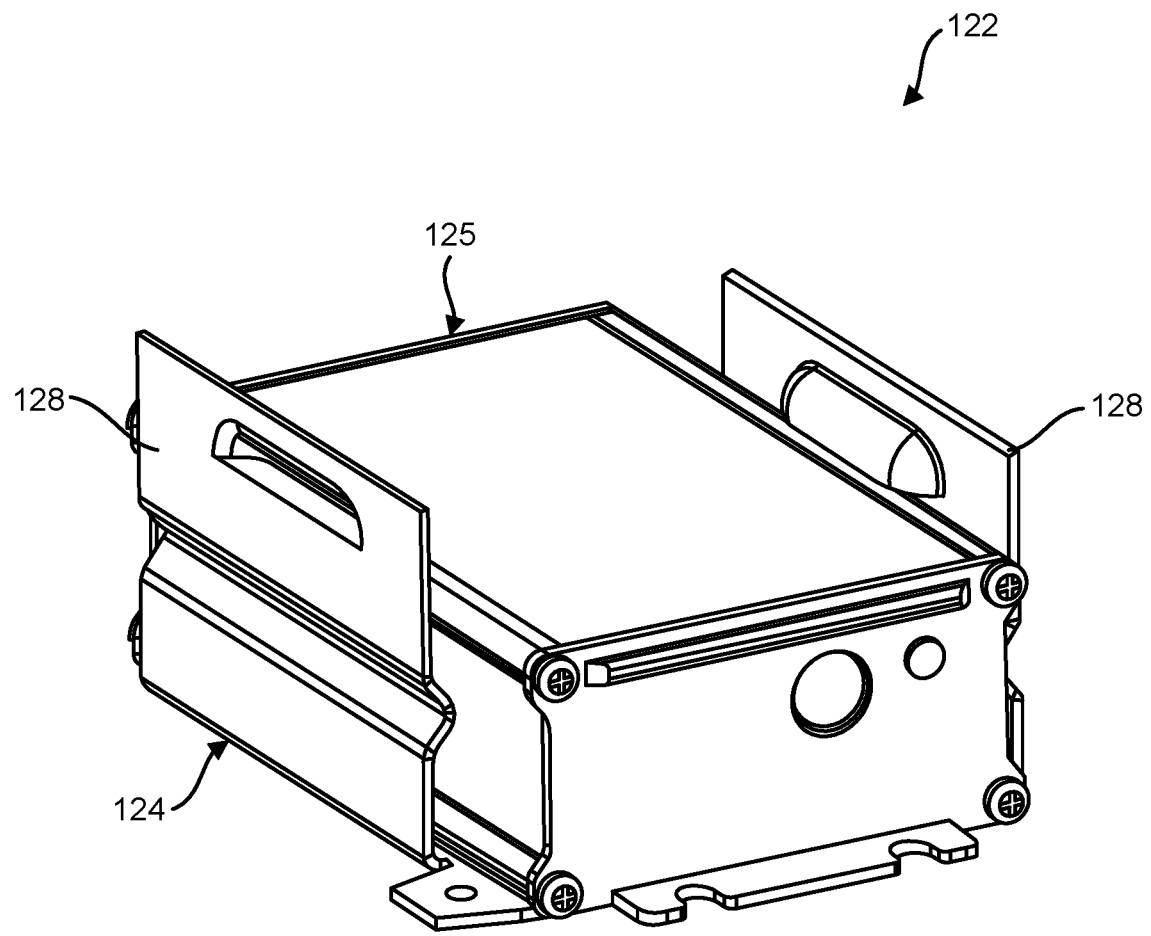
FIG. 9 is a bottom perspective of a driver assembly of another embodiment.
Figure 10:
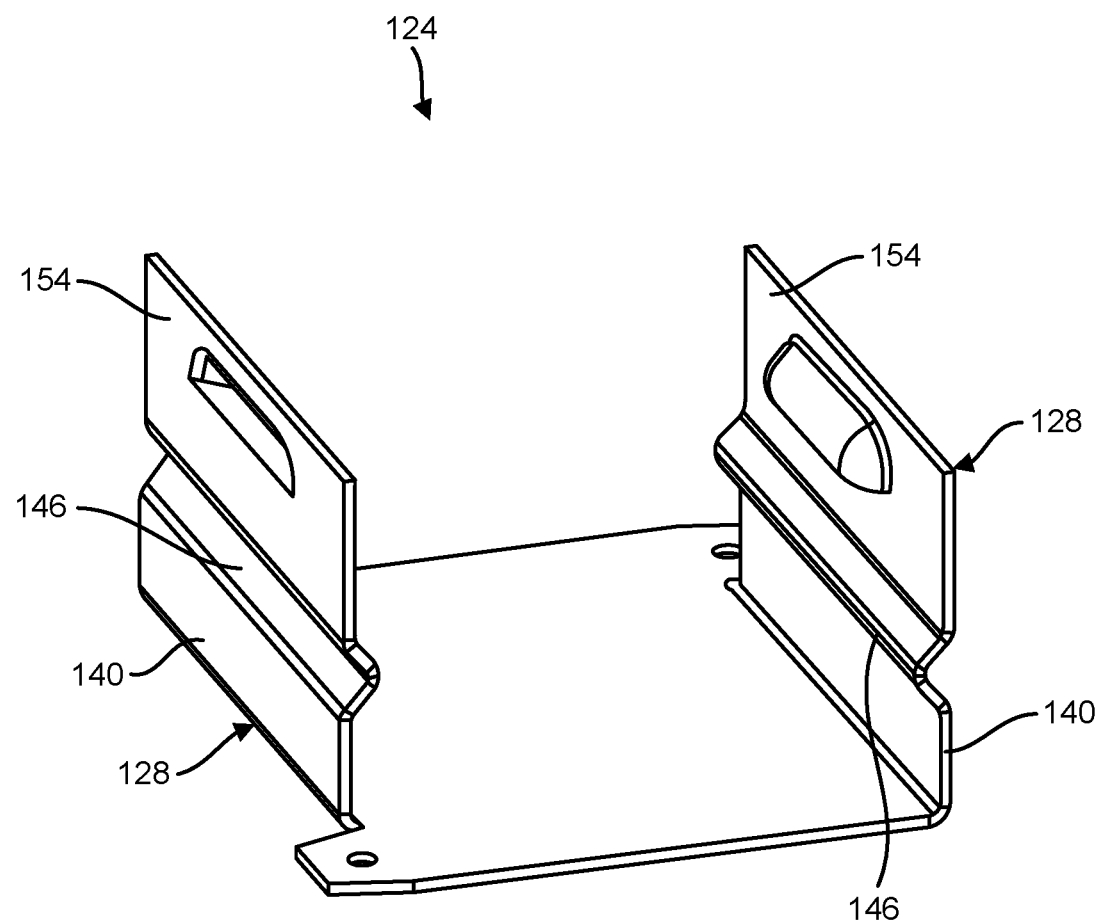
FIG. 10 is a bottom perspective of a mounting bracket of the driver assembly of FIG. 19.
Figure 11:
FIG. 11 is an end view of the mounting bracket of FIG. 10.
Figure 12:
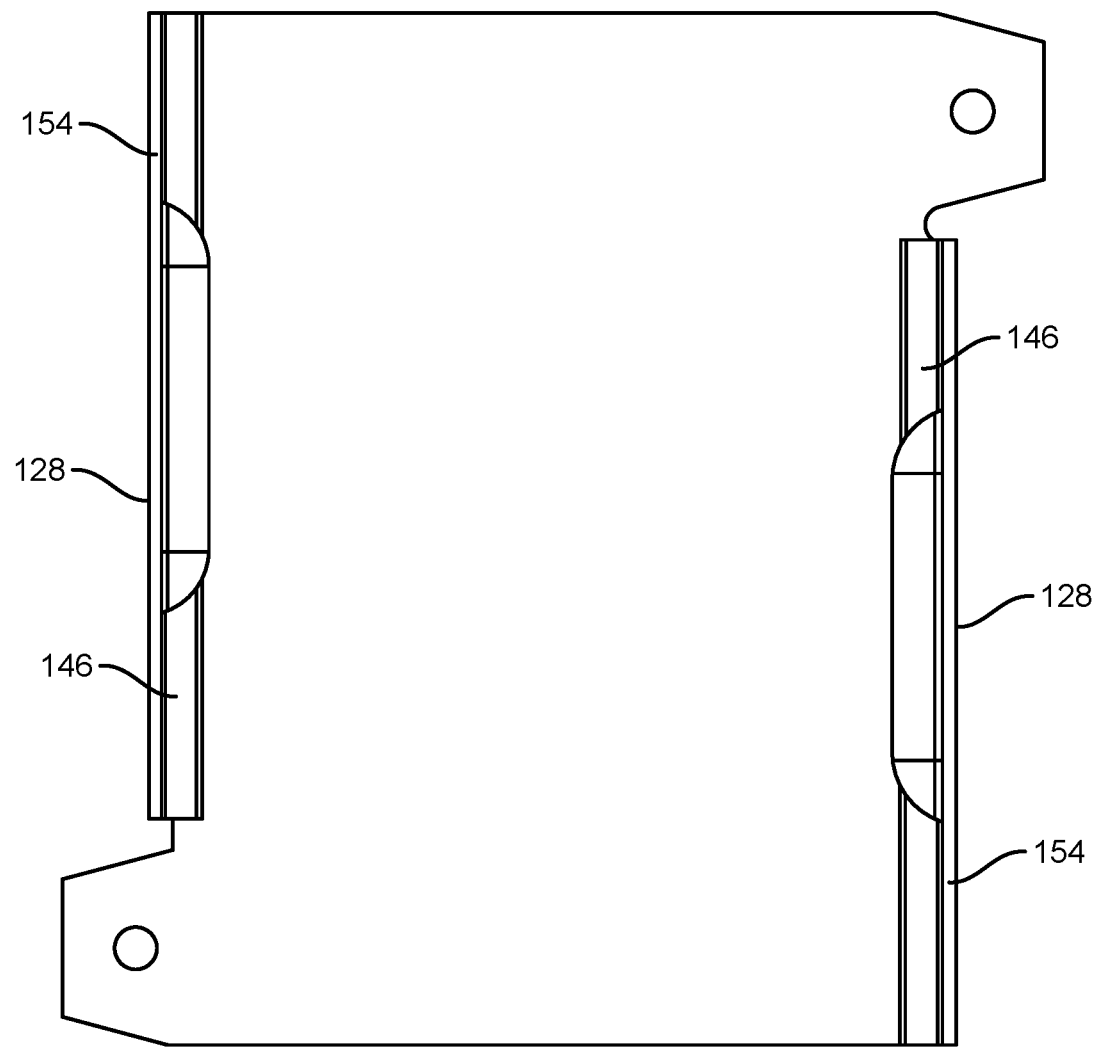
FIG. 12 is a bottom view of the mounting bracket of FIG. 10.
Figure 13:
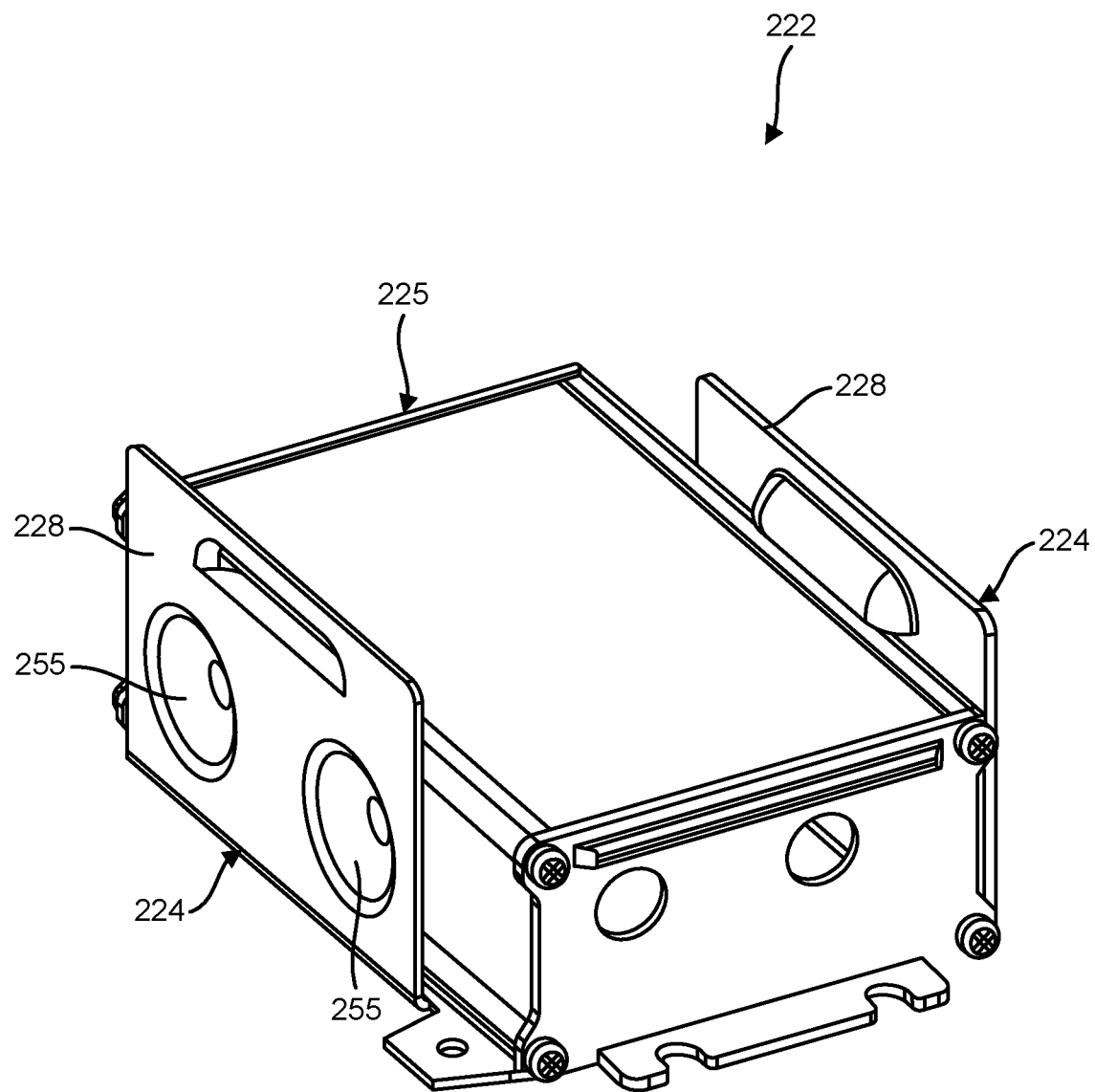
FIG. 13 is a perspective of a driver assembly of another embodiment.
Figure 14:
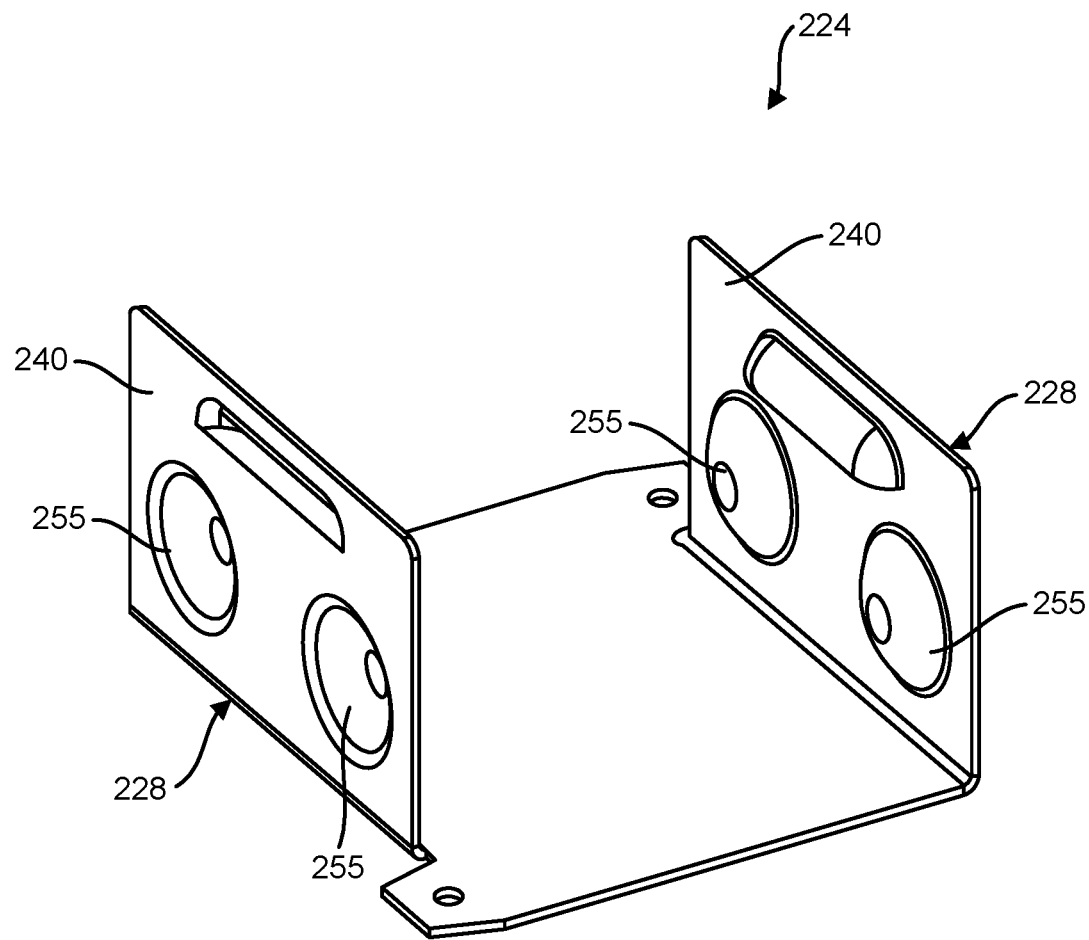
FIG. 14 is a bottom perspective of a mounting bracket of the driver assembly of FIG. 13.
Figure 15:
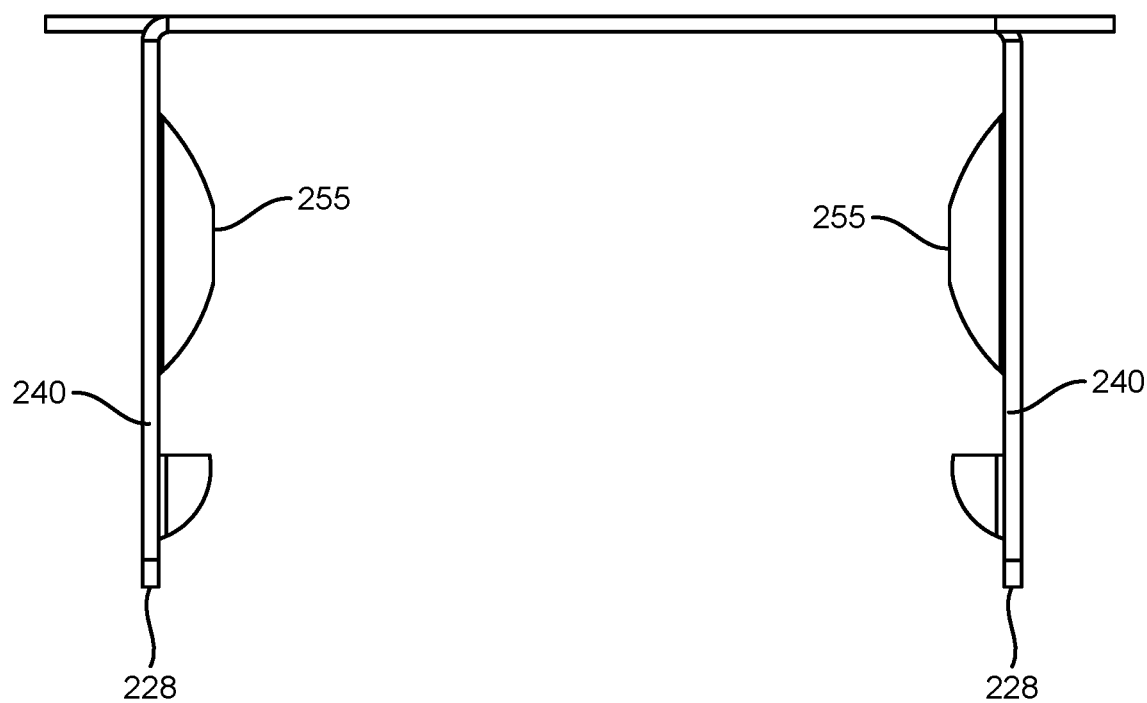
FIG. 15 is an end view of the mounting bracket of FIG. 14.
Figure 16:
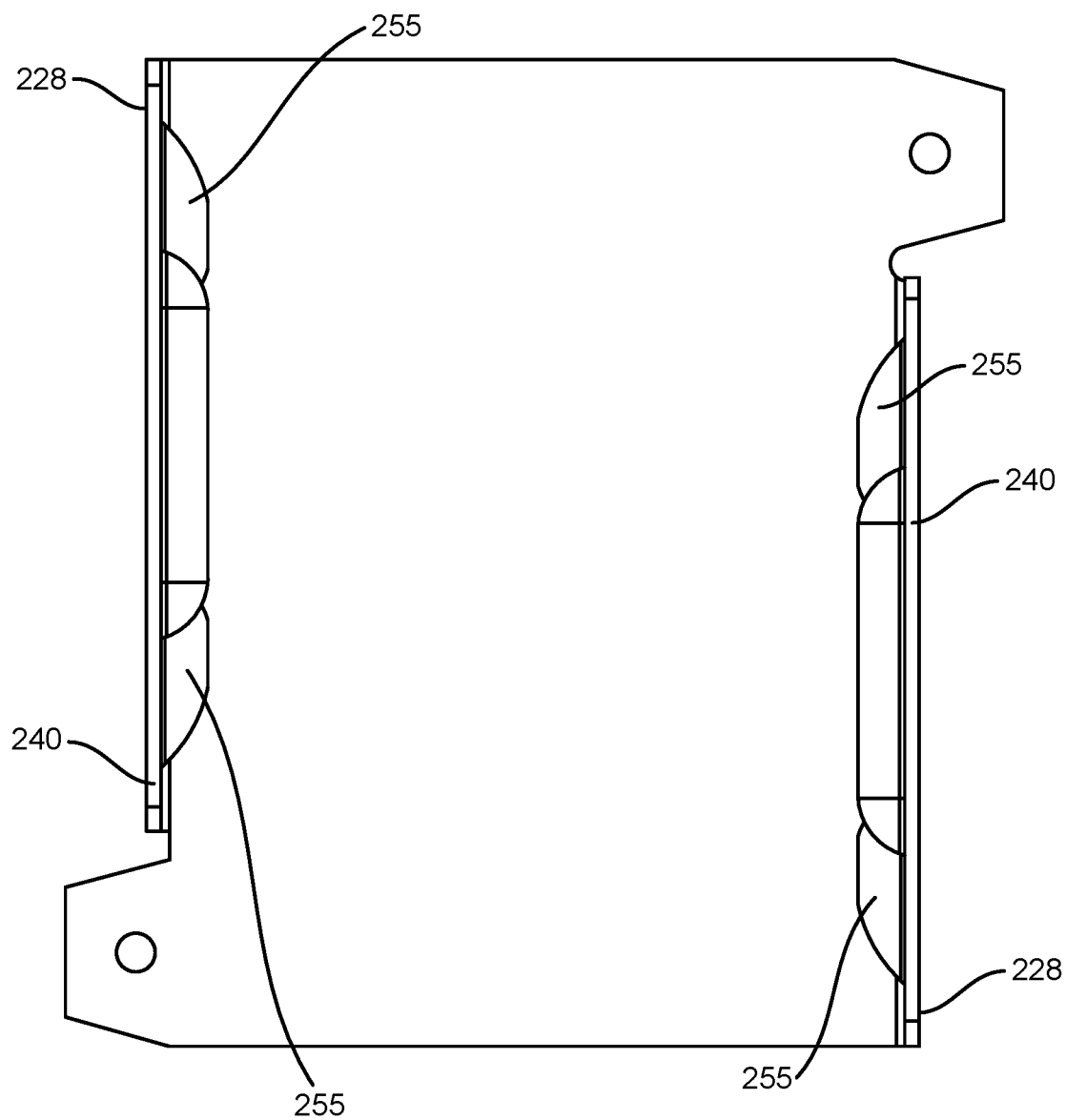
FIG. 16 is a bottom view of the mounting bracket of FIG. 14.

Referring to FIGS. 5, 6, and 8, a catch 56 projects inward from an inner surface of the third portion 54 of each flange 28. In the illustrated embodiment, the catch 56 is punched from the third portion 54. However, the catch 56 could be formed by other means without departing from the scope of the disclosure. For instance, the catch 56 may be a separate component that is suitably attached to the third portion 54. As shown in FIG. 6, the catch 56 includes a planar top surface 58 extending laterally inward from the third portion 54 and a curved surface 60 extending downward from the top surface to the third portion of the flange 28.

In the illustrated embodiment, each flange 28 extends from one edge 34 of the base member 26 toward the opposite edge of the base member but does not extend the full length of the base member. Instead, the flanges 28 extend to a location adjacent the tab 36 projecting from the corresponding side of the base member 26. However, the flanges 28 could extend a greater or lesser extent along the sides 32 of the base member. As discussed above, the flanges 28 could extend the entire length of the base member 28 such that the tabs 36 are omitted. Additionally, the mounting bracket 24 includes a pair of flanges 28 such that each side 32 of the base member 26 includes a single flange. However, additional flanges 28 can be included without departing from the scope of the disclosure. For instance, one or more sides 32 of the base member 26 may include a plurality of spaced apart flanges. The mounting bracket 24 is formed from any suitable material such as steel, spring steel, or aluminum. Still other materials may be used without departing from the scope of the disclosure.

Figure 4:
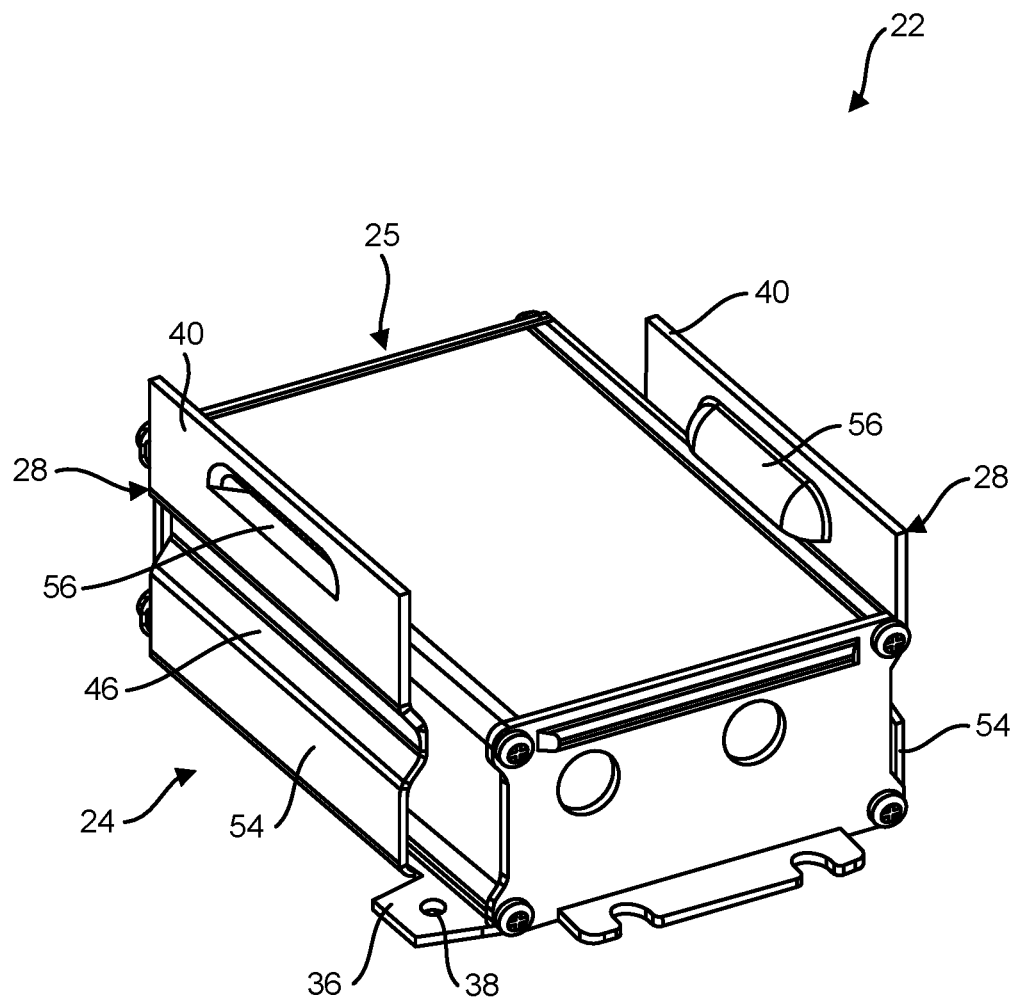
FIG. 4 is a bottom perspective of a driver assembly of the light fixture.

Referring to FIGS. 3 and 4, the mounting bracket 24 is secured to the interior surface 15 of the housing 12 by aligning the fastener holes 38 in the base member 26 of the bracket with fastener holes 62 in the interior surface and inserting fasteners through the holes thereby securing the mounting bracket to the housing. In one embodiment, the fastener holes 62 are also configured to mate with fastener holes of a driver for mounting the driver directly to the housing 12. A driver of any configuration, such as driver 25, can then be attached to the mounting bracket 24 by inserting the driver into the open bottom end of the channel 30 of the mounting bracket. Insertion of the driver 25 into the channel 30 of the mounting bracket 24 will cause the driver to engage the curved bottom surfaces 60 of the catches 56 on the flanges 28. The curved bottom surfaces 60 of the catches 56 function as ramps whereby the flanges 28 will flex outwardly away from the longitudinal axis of the base member 26 to provide clearance for the driver 25 to be moved past the catches. Continued insertion of the driver 25 will cause the driver to clear the catches 56 allowing the flanges 28 to flex back toward their resting state. In this position, the planar surfaces 58 of the catches 56 oppose a bottom surface of the driver 25 preventing the driver from falling back out of the channel 30. A width of the driver 25 may be such that the flanges 28 are not allowed to flex all the way back to their resting state. Thus, the second portion 46 of the flanges 28 may also contact sides of the driver 25 to provide a clamping force to further secure the driver in the channel 30 of the mounting bracket 24. Therefore, the mounting bracket 24 has a snap-fit or friction-fit engagement with the driver. In one embodiment, the clamping force is sufficient to prevent the driver 25 from sliding longitudinally in the channel 30. To this effect, the mounting bracket 24 is able to restrict movement of the driver 25 in all 12 degrees of freedom. Further, because the mounting bracket 24 does not rely on mating with the fastener holes in the driver 25, the mounting bracket is able to accommodate drivers having a wide variety of configurations. For example, the mounting bracket 24 can securely hold 30 W, 60 W, and 96 W drivers. Moreover, the open channel design improves thermal management by allowing heat to dissipate away from the driver 25.

When it is desirable to detach the driver 25 from the mounting bracket 24, one or both of the flanges 28 can be flexed outward and the driver can be easily pulled out of the channel 30 in the bracket while retaining the mounting bracket to the housing 12. The same or a different driver can then be attached to the mounting bracket 24. Thus, the construction of the mounting bracket 24 reduces cost, assembly time, maintenance time, as well as the total number of parts needed to assemble the luminaire 10.

Referring to FIGS. 9-12, a driver assembly of another embodiment is generally indicated at 122. The driver assembly 122 comprises a mounting bracket 124 securable to the interior surface 15 of the housing 12, and a driver 125 releasably attachable to the mounting bracket to retain the driver in the housing 12. The driver assembly 122 is substantially identical to driver assembly 22 except that second portion 146 of the flanges 128 has a different configuration. The second portion 146 extends from the first portion 140 and defines a clamp for engaging the driver 125 to hold the driver in the mounting bracket 124. The second portion 146 includes a first section 148 extending directly from the first portion 140. The first section 148 is planar and extends inward from the first portion 140 at an angle. In one embodiment, the first section 148 extends inward at about a 45-degree angle. A second section 152 of the second portion 146 extends directly form the first section 148. The second section 152 is planar and extends outward from the first section 148 at an angle. In one embodiment, the second section 152 extends outward from a vertical plane at about a 45-degree angle. A third portion 154 of each flange 128 extends directly from the second portion 146. The third portion 154 is planar and extends generally parallel to the first portion 140. In one embodiment, the third portion 154 extend along a common axis with the first portion 140.

Referring to FIGS. 13-16, a driver assembly of another embodiment is generally indicated at 222. The driver assembly 222 comprises a mounting bracket 224 securable to the interior surface 15 of the housing 12, and a driver 225 releasably attachable to the mounting bracket to retain the driver in the housing 12. The driver assembly 222 is substantially identical to driver assembly 22 except that flanges 228 comprise a single planar portion 240. Dimples 255 are formed in the flanges 228 and project inward form the flanges. In the illustrated embodiment, the dimples 255 are formed integrally with the flanges 228. However, the dimples 255 could be separately formed from the flange 228 and suitably attached. In this embodiment, the dimples are configured to engage the driver 225 to transfer the clamping force of the flanges 228 to the driver.

Referring to FIGS. 17-21, a driver assembly of another embodiment is generally indicated at 322. The driver assembly 322 comprises a mounting bracket 324 securable to the interior surface 15 of the housing 12, and a driver 325 releasably attachable to the mounting bracket to retain the driver in the housing 12. The mounting bracket 324 comprises a base member 326, flanges 328 extending laterally from longitudinal ends of the base member, and projections 329 extending laterally from sides of the base member. In the illustrated embodiment, the base member 326 comprises an elongate plate including longitudinally extending sides 332 and laterally extending edges 334 disposed at longitudinal ends of the base member. The base member 326 has a generally slanted and truncated rectangular shape. However, the base member 326 could have other shapes without departing from the scope of the disclosure. Tabs or projections 336 are disposed at end margins of the base member 326 and extend laterally outward such that the tabs project past the longitudinal sides 332 of the base member in opposite directions. In the illustrated embodiment, a first tab 336 is disposed at one end of the base member 326 and projects in a first direction transverse to a longitudinal axis of the base member at one side of the base member, and a second tab 336 is disposed at the opposite end of the base member and projects in a second direction, opposite the first direction, and transverse to the longitudinal axis of the base member at the opposite side of the base member. The tabs 336 define fastener holes 338 for receiving fasteners (now shown) to secure the mounting bracket 324 to the interior surface 15 of the housing 12. In the illustrated embodiment, the tabs 336 have a generally trapezoidal shape. However, the tabs 336 could have other shapes and configurations without departing from the scope of the disclosure. Additionally, the tabs 336 could be omitted.

Each flange 328 extends laterally from one of the edges 334 of the base member 326. In the illustrated embodiment, each flange 328 extends generally downward and inward from the base member 326. However, the flanges 328 could extend at other angles without departing from the scope of the disclosure. Each flange 328 includes a first portion 340 extending from the base member 326. The first portion includes a bend 342 that extends directly from the edge 334 of the base member 326 and curves out of plane from the base member such that the first portion extends downward from the base member and inward toward the base member. In the illustrated embodiment, the first portion includes a planar section extending from the bend 342. A second portion 346 of each flange 328 extends from the first portion 340. The second portion 346 includes a bend extending directly from the first portion 340, and a planar section extending from the bend. The bend curves upward and away from the base member 326 such that the planar section of the second portion extends generally upward and away from the base member. The first and second portions 340, 346 define a clamp for engaging the driver 325 to hold the driver in the mounting bracket 324.

The projections 329 extend laterally from the sides 332 of the base member 326. In the illustrated embodiment, each projection 329 extends generally orthogonally to the base member 326. Each projection 329 includes a bend extending directly from the base member 326 and a planar section extending from the bend. The planar section of the projection 329 extends generally orthogonally to the base member 326. The projections 329 could extend from the base 326 at other angles without departing from the scope of the disclosure.

Figure 17:
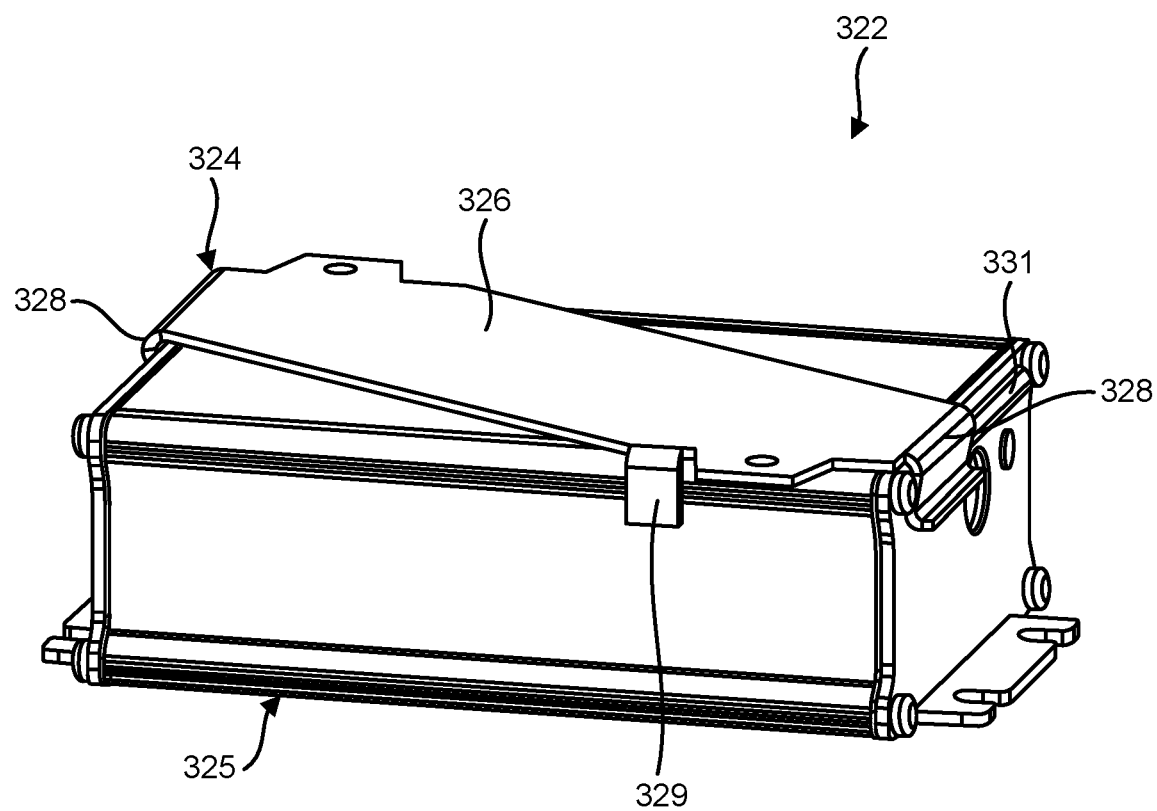
FIG. 17 is a perspective of a driver assembly of another embodiment.
Figure 18:
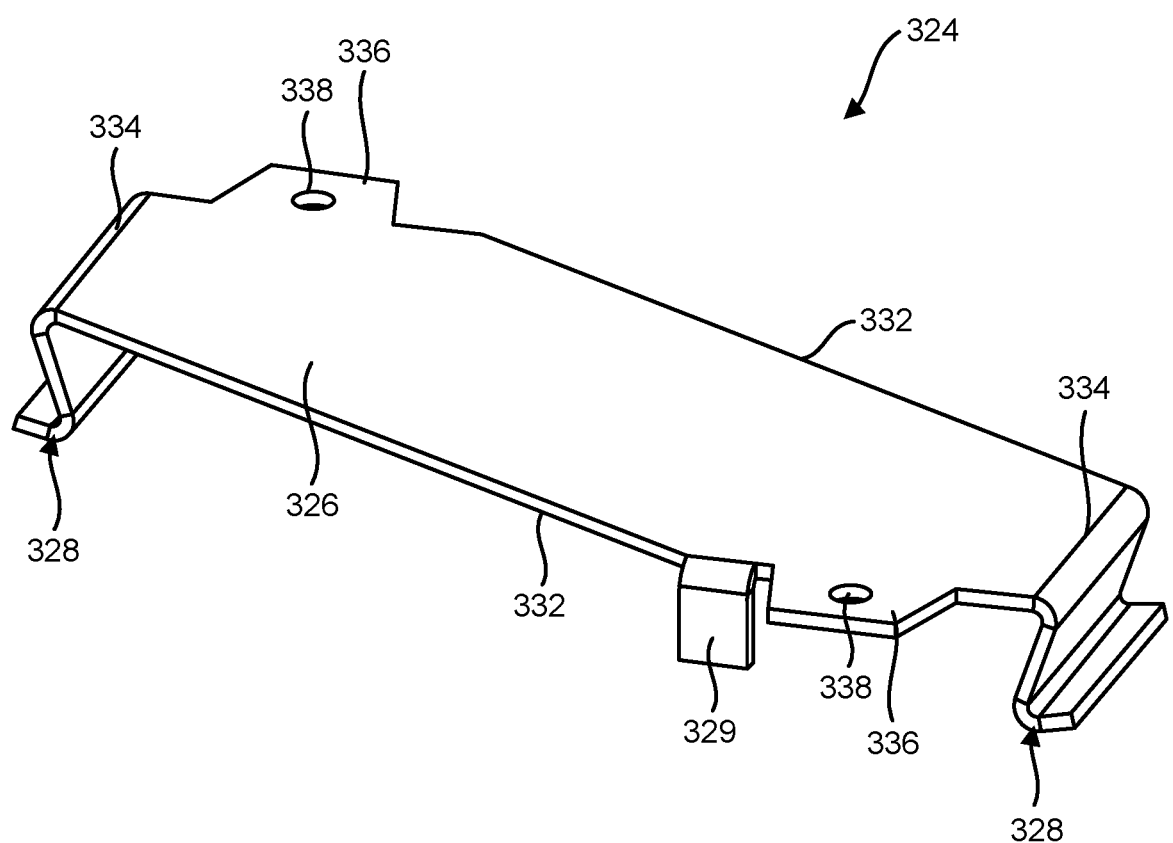
FIG. 18 is a perspective of a mounting bracket of the driver assembly of FIG. 17.
Figure 19:
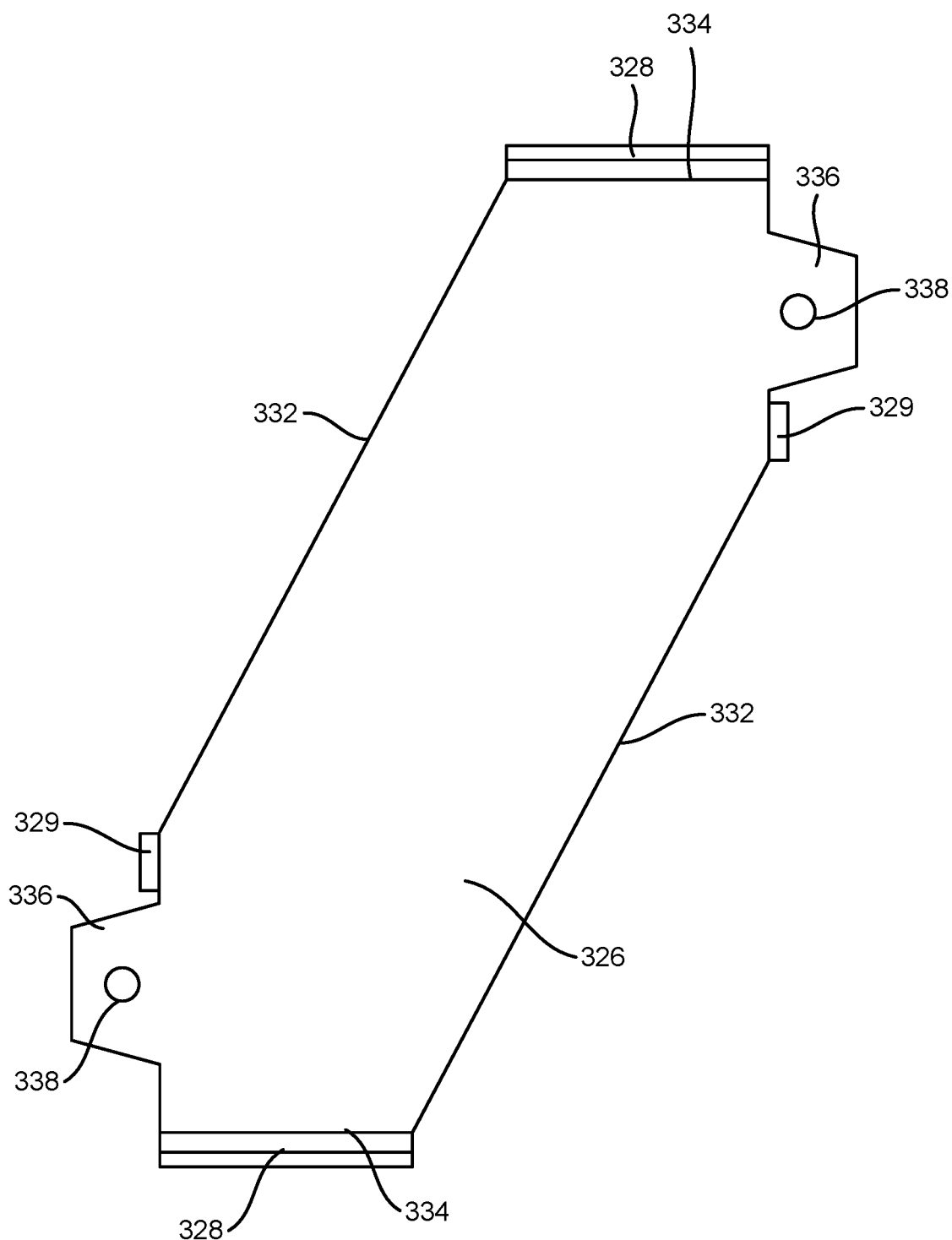
FIG. 19 is a top view of the mounting bracket of FIG. 17.
Figure 20:
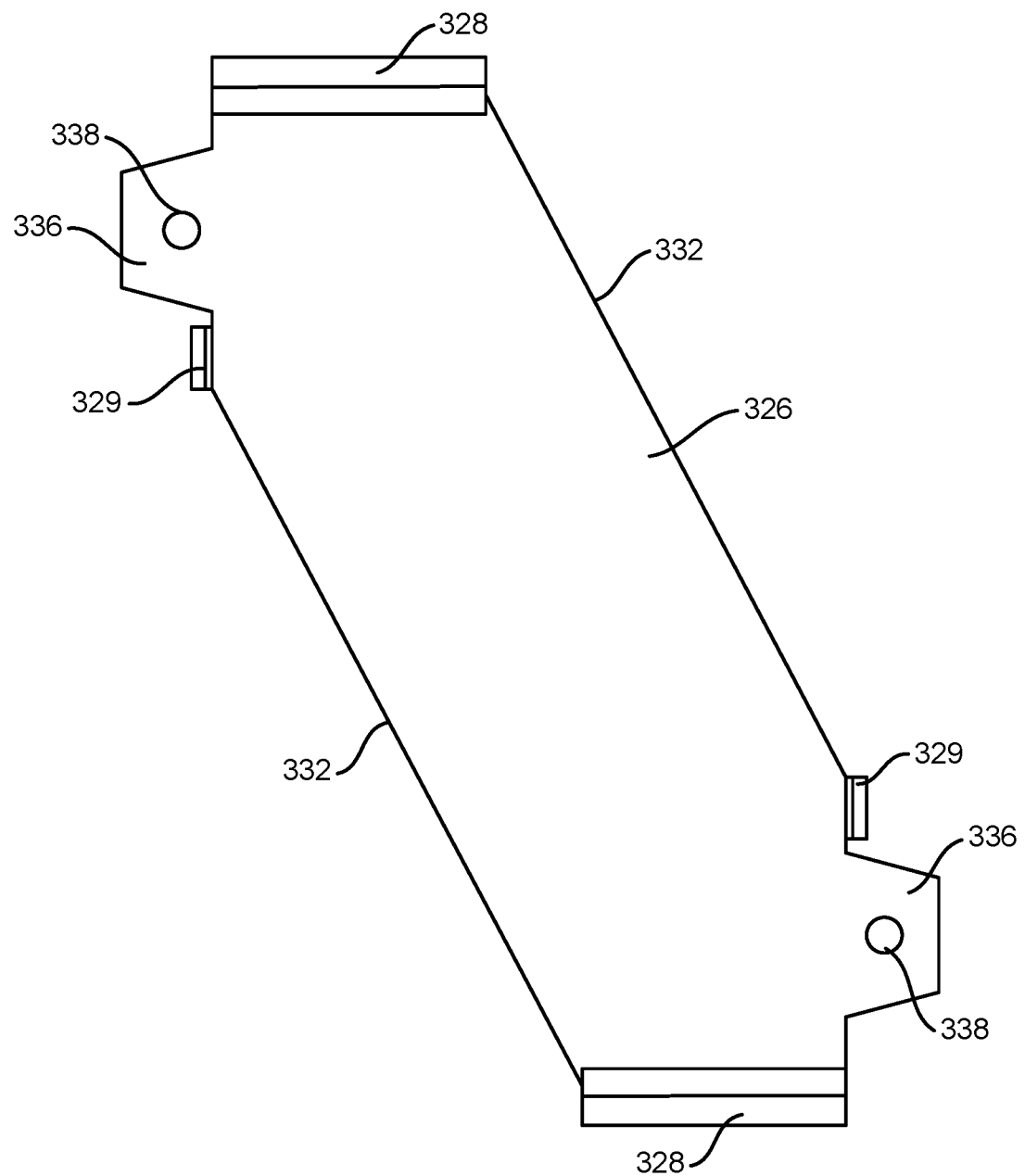
FIG. 20 is a bottom view of the mounting bracket of FIG. 17.
Figure 21:
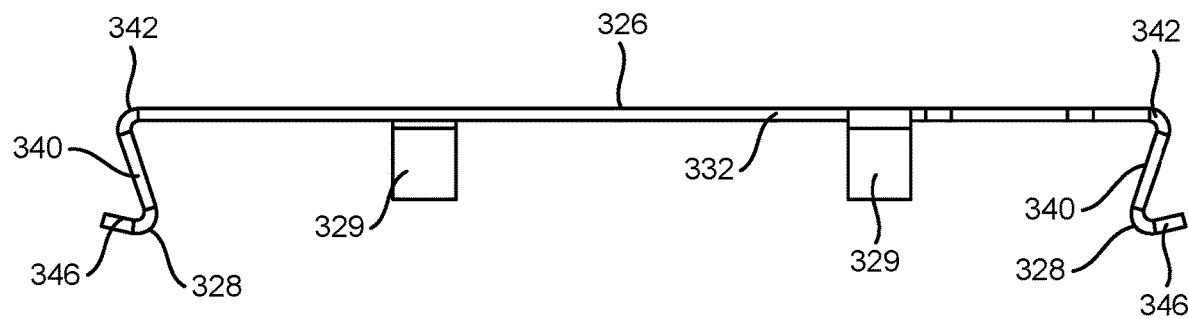
FIG. 21 is a side view of the mounting bracket of FIG. 17.
Figure 22:
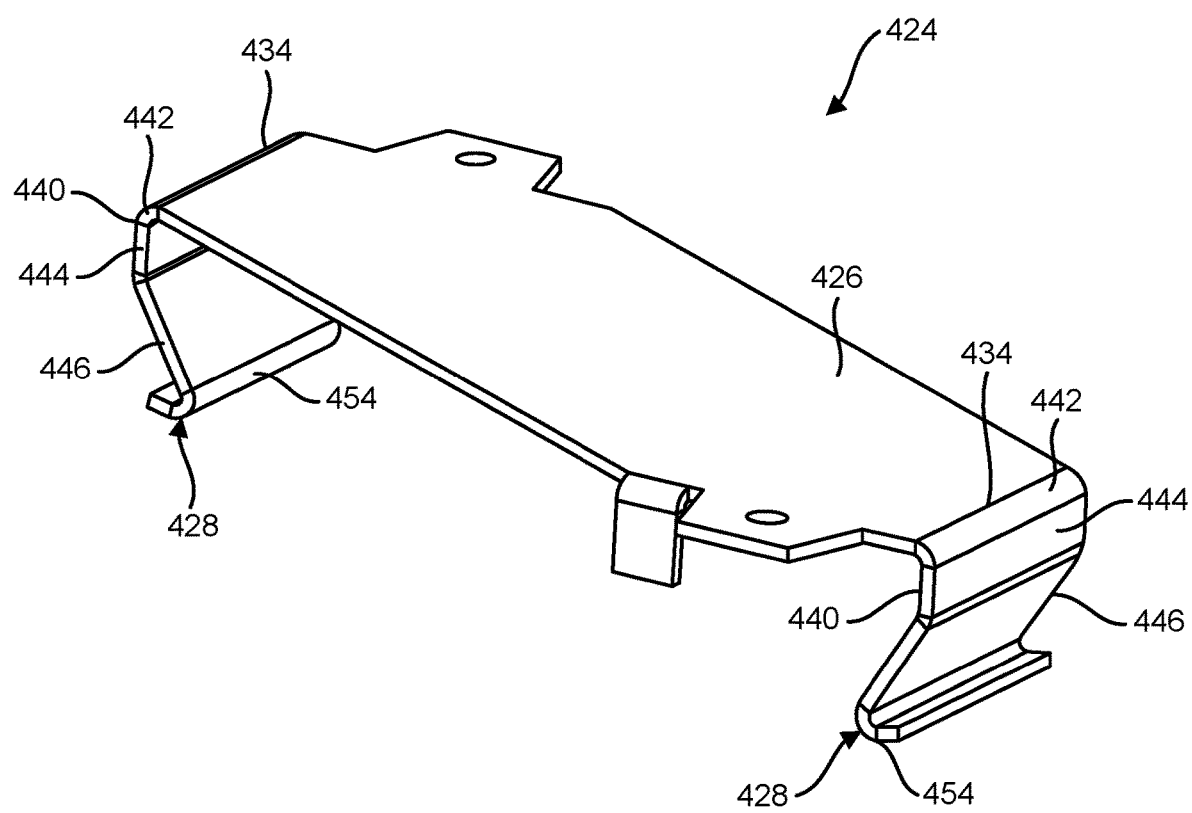
FIG. 22 is a perspective of a mounting bracket of another embodiment.
Figure 23:
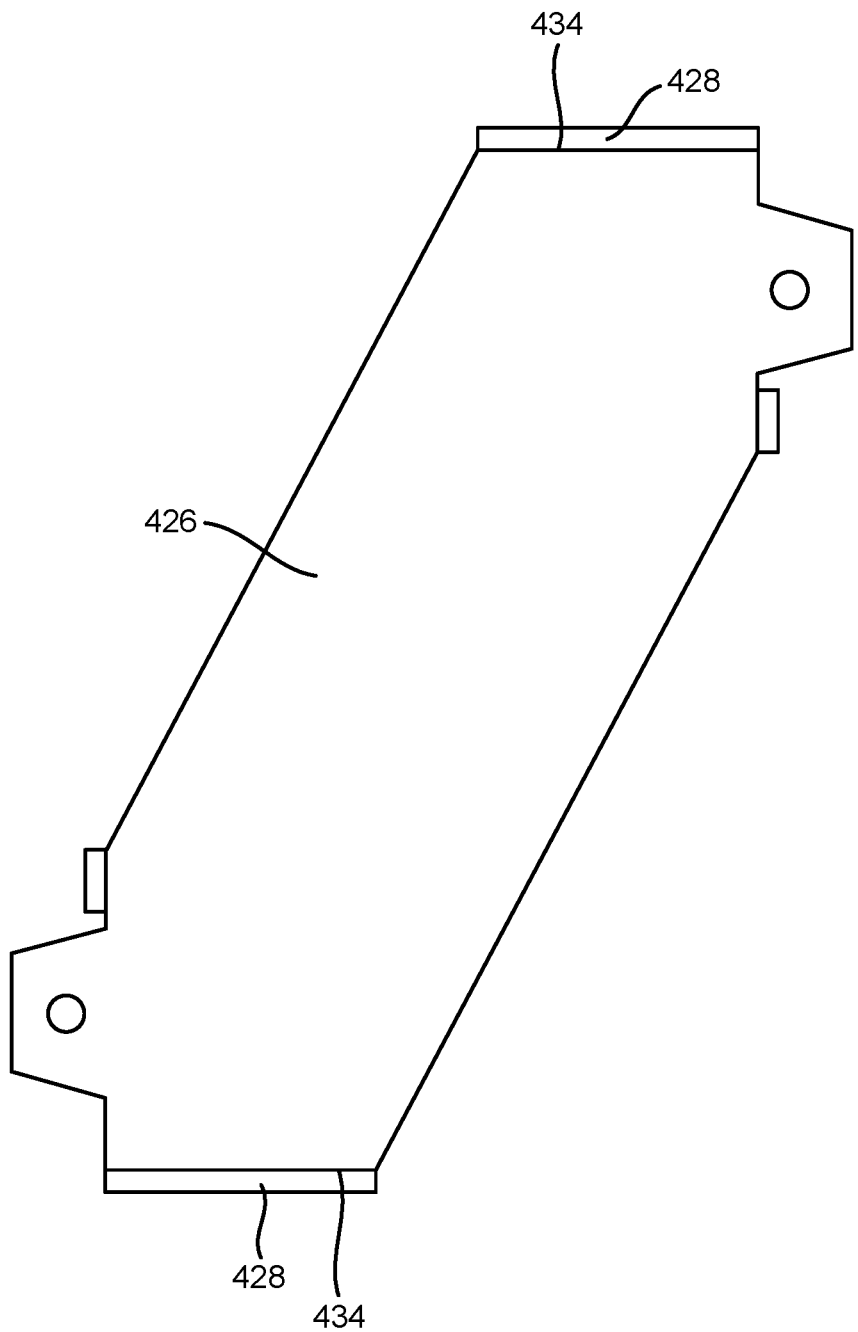
FIG. 23 is a top view of the mounting bracket of FIG. 22.
Figure 24:
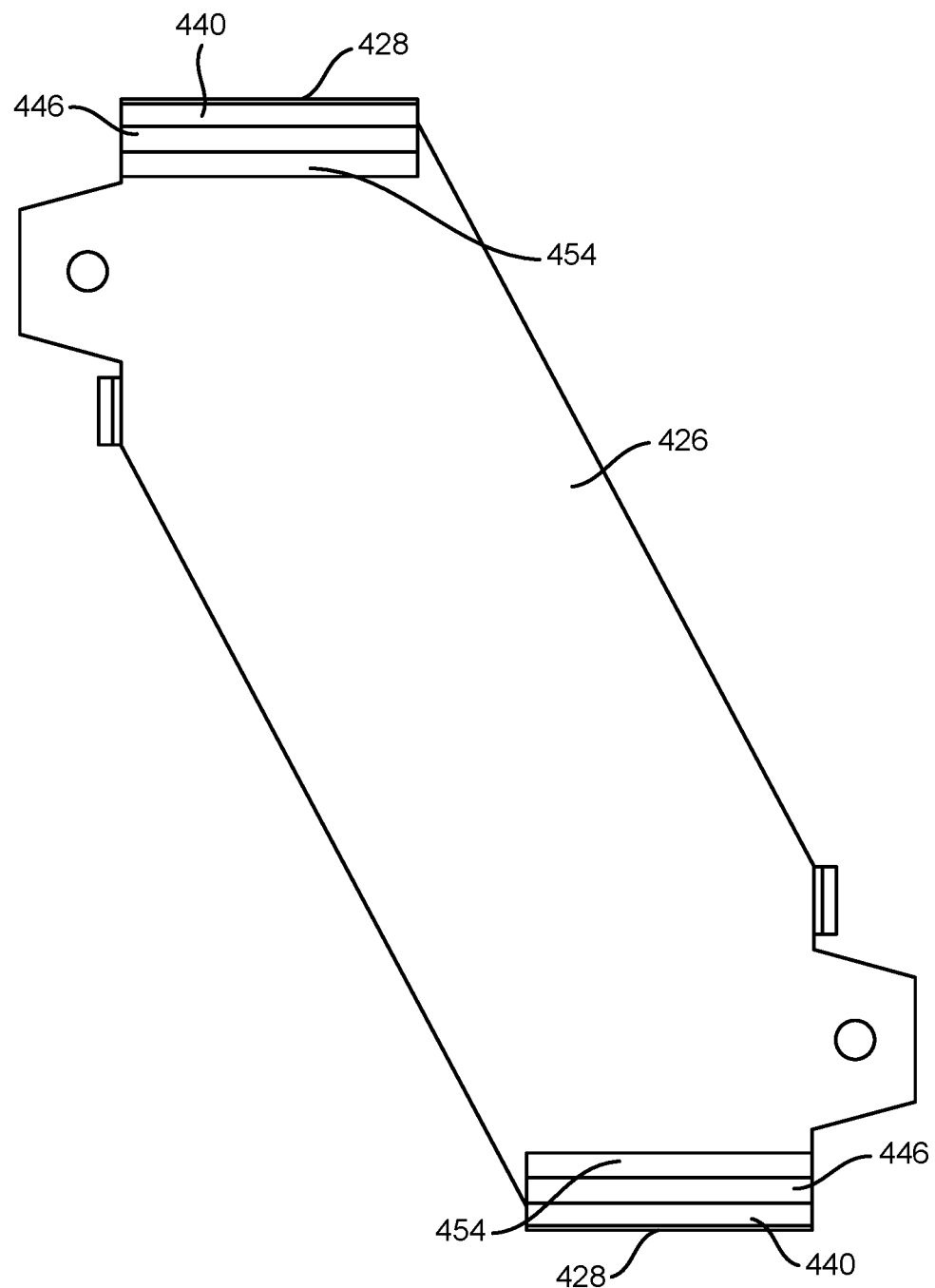
FIG. 24 is a bottom view of the mounting bracket of FIG. 22.
Figure 25:
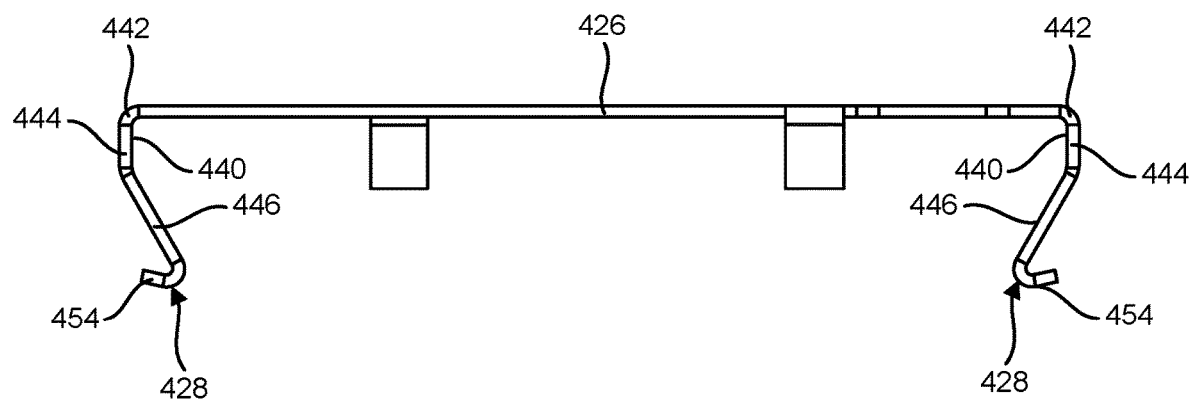
FIG. 25 is a side view of the mounting bracket of FIG. 22.
Figure 26:
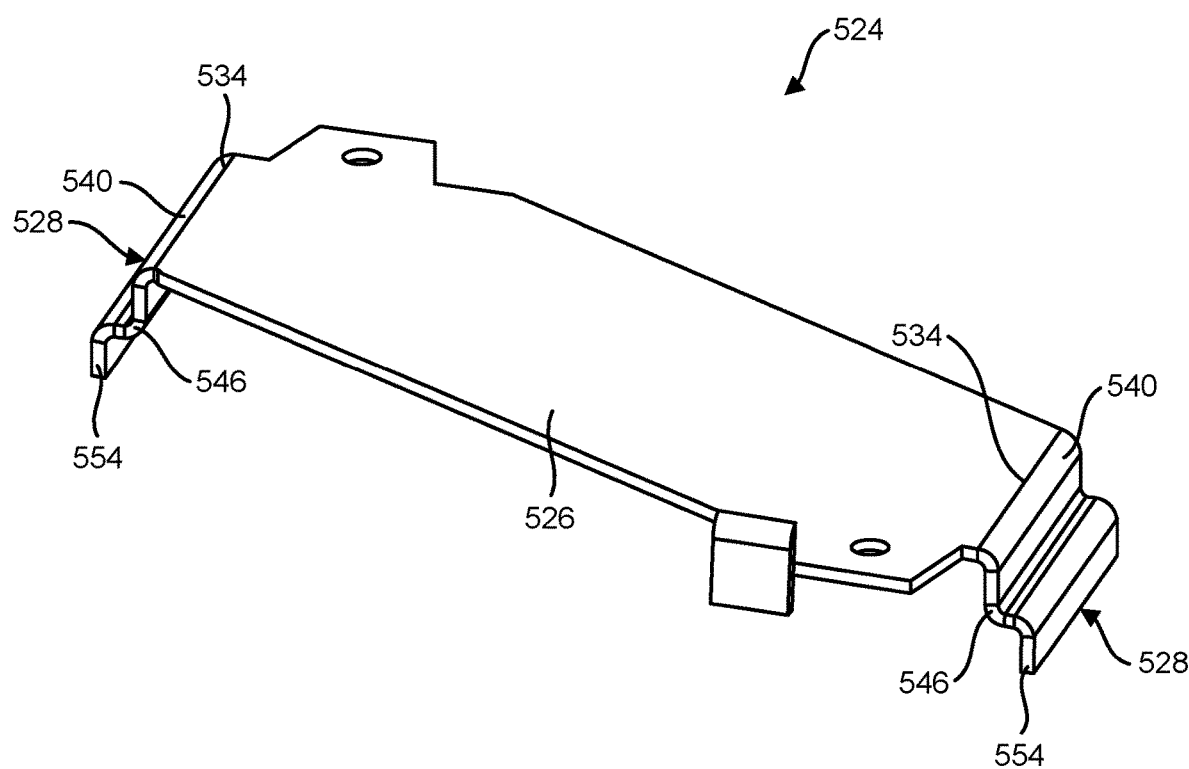
FIG. 26 is a perspective of a mounting bracket of another embodiment.
Figure 27:
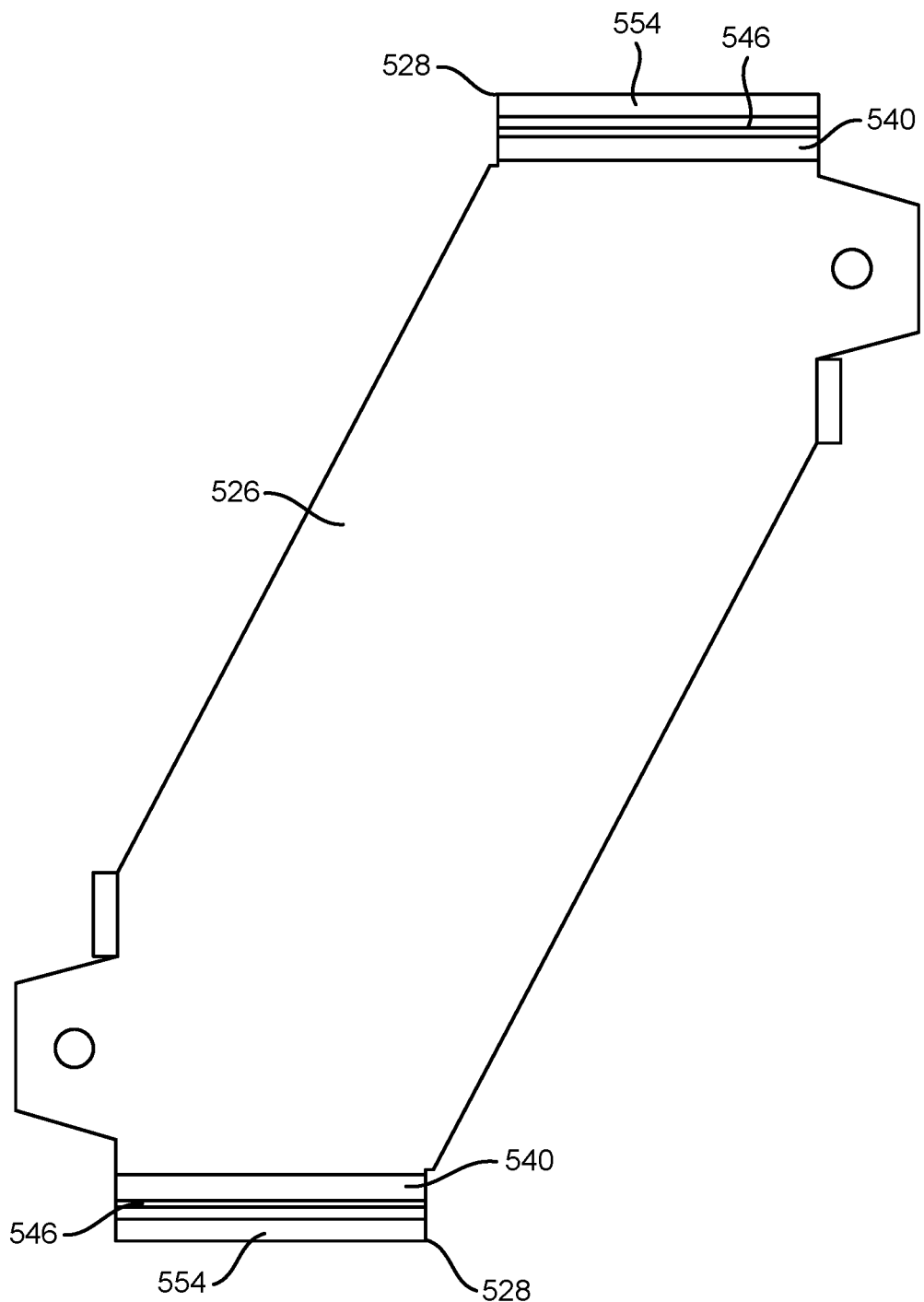
FIG. 27 is a top view of the mounting bracket of FIG. 26.
Figure 28:
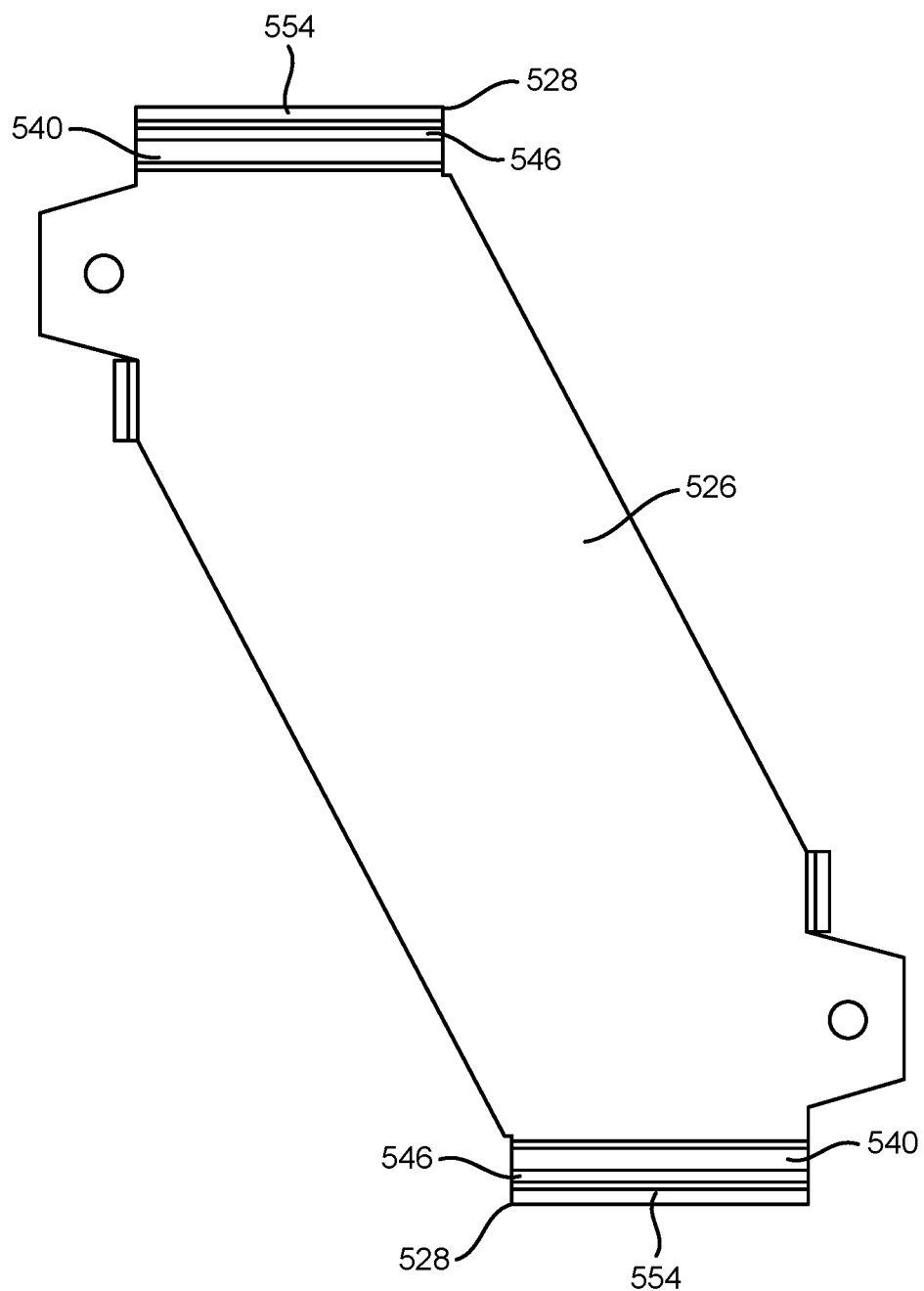
FIG. 28 is a bottom view of the mounting bracket of FIG. 26.
Figure 29:
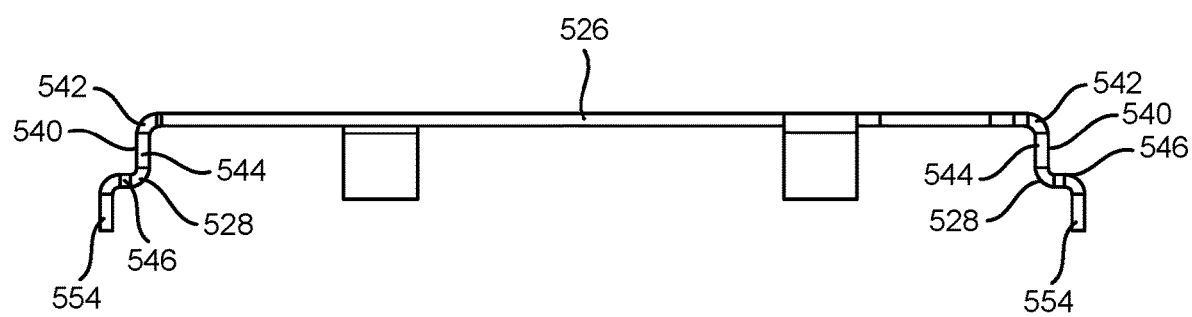
FIG. 29 is a side view of the mounting bracket of FIG. 26.
Figure 30:
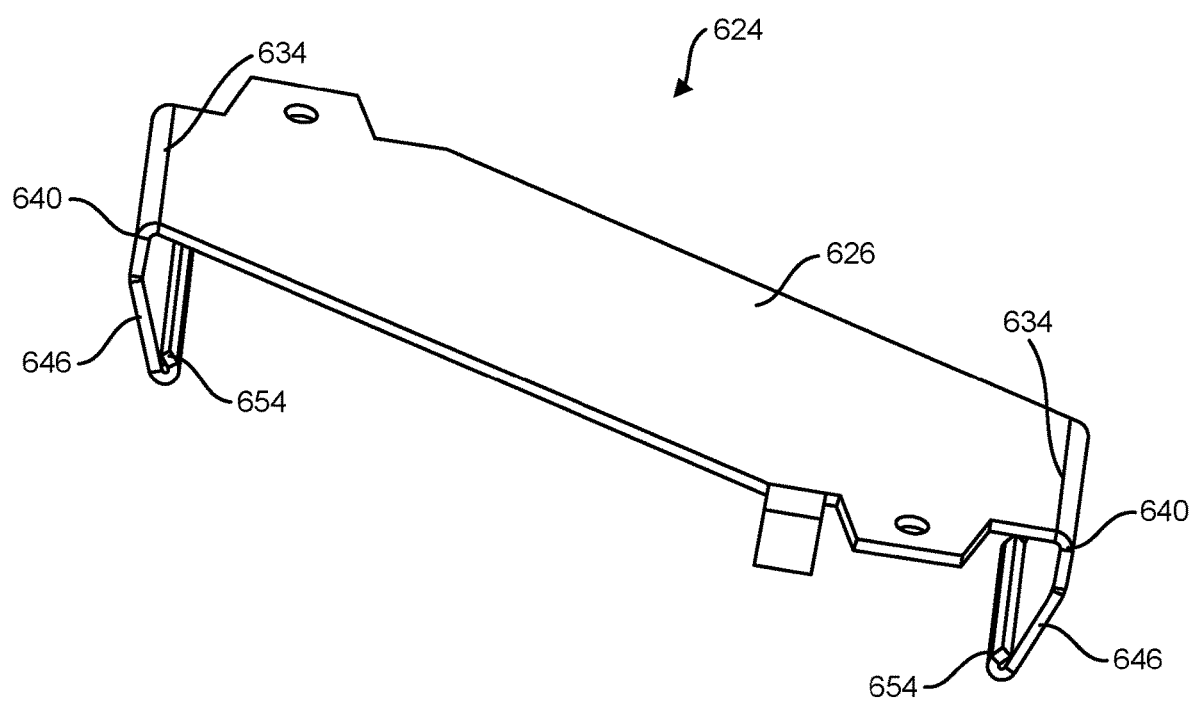
FIG. 30 is a perspective of a mounting bracket of another embodiment.
Figure 31:
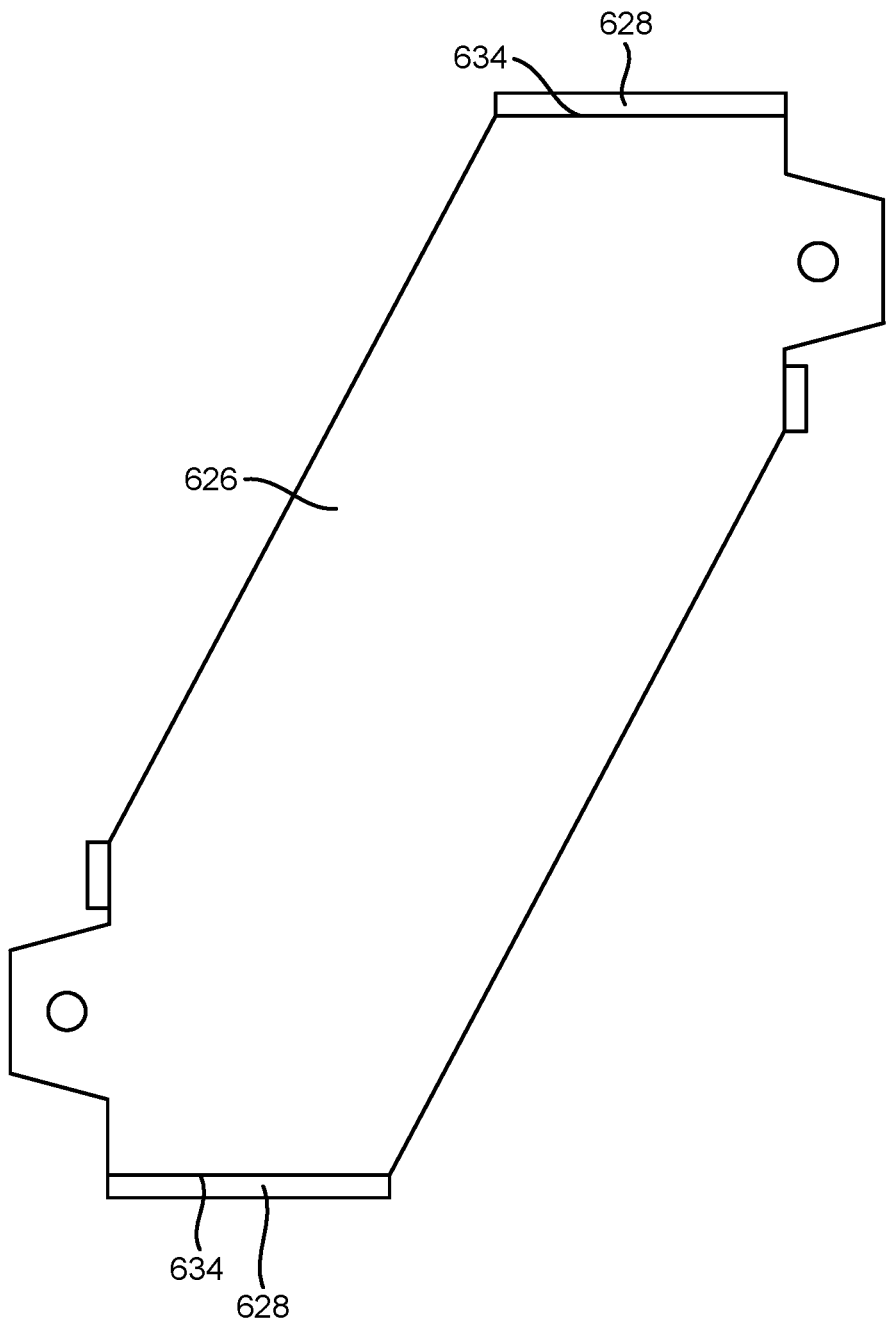
FIG. 31 is a top view of the mounting bracket of FIG. 30.
Figure 32:
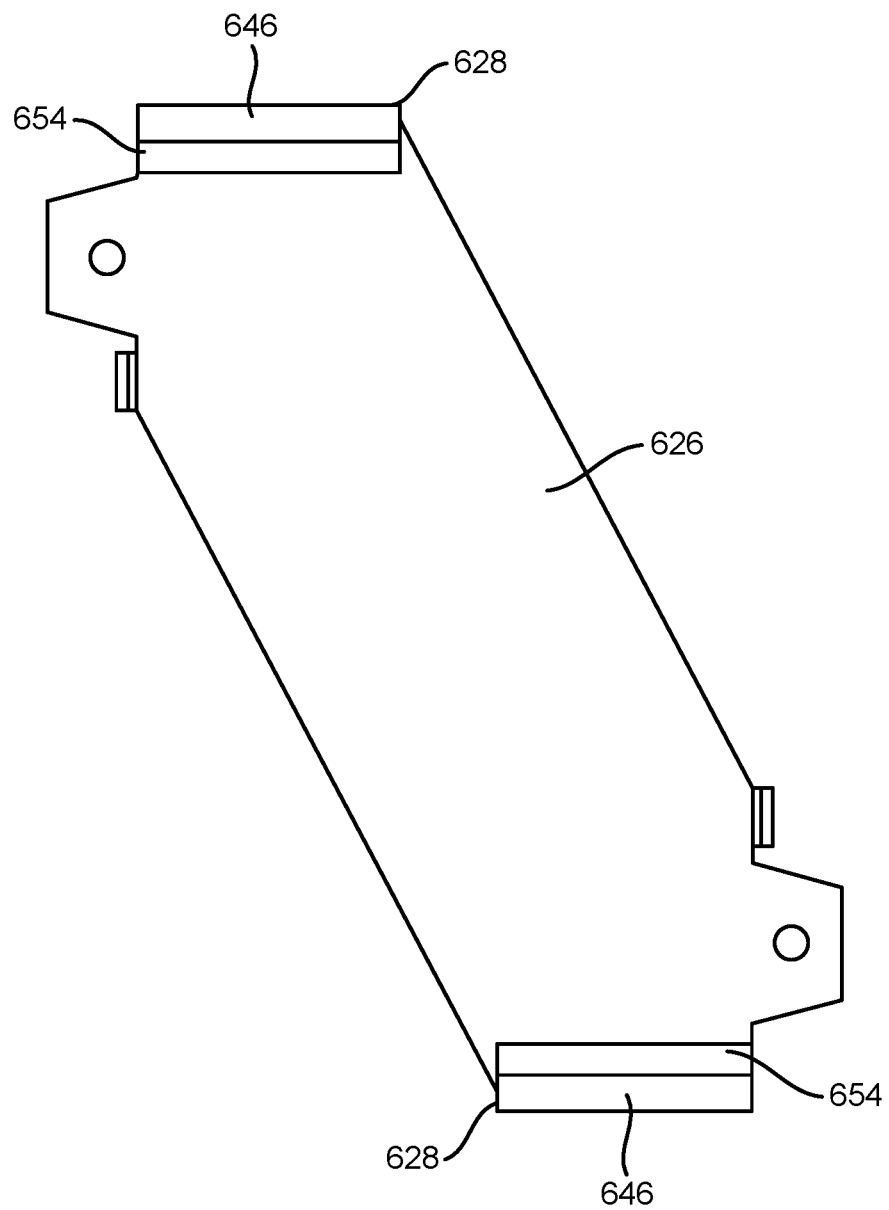
FIG. 32 is a bottom view of the mounting bracket of FIG. 30.
Figure 33:
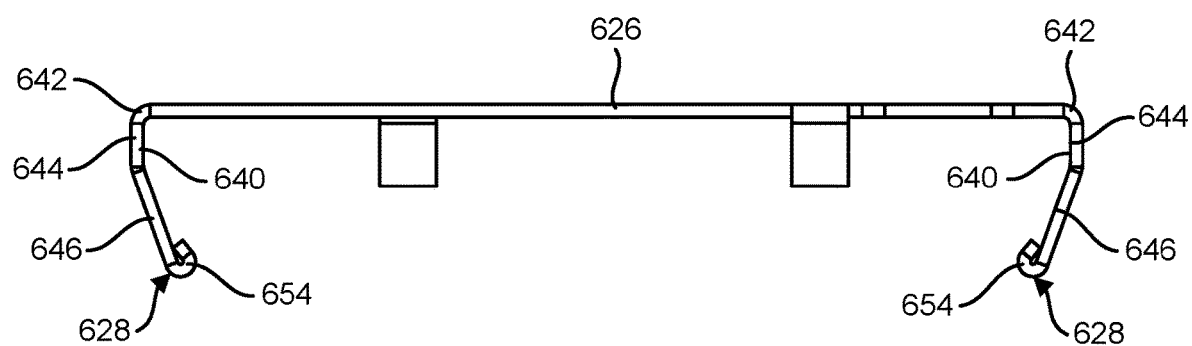
FIG. 33 is a side view of the mounting bracket of FIG. 30.
Corresponding reference characters indicate corresponding parts throughout the drawings.

Referring to FIG. 17, the mounting bracket 324 is secured to the interior surface 15 of the housing 12 by aligning the fastener holes 338 in the base member 326 of the bracket with fastener holes 62 in the interior surface and inserting fasteners through the holes thereby securing the mounting bracket to the housing. A driver of any configuration, such as driver 325, can then be attached to the mounting bracket 324 by inserting the driver into the open bottom of the mounting bracket. Insertion of the driver 325 into the open bottom of the mounting bracket 324 will cause the driver to engage the bend of the second portion 346 of the flanges 328. The bend of the second portion 346 function as a ramp whereby the flanges 328 will flex outwardly away from the base member 326 to provide clearance for the driver 325 to be moved past the bend. Continued insertion of the driver 325 will cause the driver to clear the bend allowing the flanges 328 to flex back toward their resting state. A length of the driver 325 may be such that the flanges 328 are not allowed to flex all the way back to their resting state. Thus, the bend of the second portion 346 of the flanges 328 may contact ends of the driver 325 to provide a clamping force to secure the driver to the mounting bracket 24. In one embodiment, the driver 325 may have structure such as a rib 331 configured to oppose the clamp of the mounting bracket 324 to releasably hold the driver to the mounting bracket. Additionally, the projections 329 will oppose sides of the driver 325 to prevent lateral movement of the driver. Thus, the mounting bracket 324 restricts movement of the driver 325 in 12 degrees of freedom. When it is desirable to detach the driver 325 from the mounting bracket 324, one or both of the flanges 328 can be flexed outward and the driver can be easily pulled away from the bracket while retaining the mounting bracket to the housing 12.

Referring to FIGS. 22-25, a mounting bracket of another embodiment is generally indicated at 424. The mounting bracket 424 is securable to the interior surface 15 of the housing 12 for releasably attaching a driver to the mounting bracket to retain the driver in the housing 12. The mounting bracket 424 is substantially identical to mounting bracket 324 except that each flange 428 of the mounting bracket has a slightly different configuration. In particular, each flange 428 includes a first portion 440 extending from the base member 426. The first portion includes a bend 442 that extends directly from the edge 434 of the base member 426 and curves out of plane from the base member such that a planar section 444 of the first portion extends generally orthogonally to the base member. A second portion 446 of each flange 428 extends from the first portion 440. The second portion 446 includes a bend extending directly from the first portion 440, and a planar section extending from the bend. The bend curves downward and toward from the base member 426 such that the planar section of the second portion extends generally downward and toward from the base member. In one embodiment, the second portion 446 extends inward at about a 45-degree angle. A third portion 454 of each flange 428 extends directly from the second portion 446. The third portion 454 includes a bend extending directly from the second portion 446, and a planar section extending from the bend. The bend curves upward and away from the base member 426 such that the planar section of the third portion extends generally upward and away from the base member. In one embodiment, the third portion 454 extends upward relative to a vertical axis at about a 30-40 degree angle. The second and third portions 446, 454 define a clamp for engaging the driver to hold the driver in the mounting bracket 424. The mounting bracket 424 otherwise functions identically to mounting bracket 324 of the previous embodiment.

Referring to FIGS. 26-29, a mounting bracket of another embodiment is generally indicated at 524. The mounting bracket 524 is securable to the interior surface 15 of the housing 12 for releasably attaching a driver to the mounting bracket to retain the driver in the housing 12. The mounting bracket 524 is substantially identical to mounting bracket 324 except that each flange 528 of the mounting bracket has a slightly different configuration. In particular, each flange 528 includes a first portion 540 extending from the base member 526. The first portion includes a bend 542 that extends directly from the edge 534 of the base member 626 and curves out of plane from the base member such that a planar section 544 of the first portion extends generally orthogonally to the base member. A second portion 546 of each flange 428 extends from the first portion 540. The second portion 546 includes a bend extending directly from the first portion 540, and a planar section extending from the bend. The bend curves downward and away from the base member 526 such that the planar section of the second portion extends away from the base member. In one embodiment, the second portion 546 extends generally parallel to the base member 526. A third portion 554 of each flange 528 extends directly from the second portion 546. The third portion 554 includes a bend extending directly from the second portion 546, and a planar section extending from the bend. The bend curves downward and away from the base member 526 such that the planar section of the third portion 554 extends away from the base member. In one embodiment, the third portion 554 extends generally orthogonally to the base member 526. The first and second portions 540, 546 define a clamp for engaging the driver to hold the driver in the mounting bracket 524. The mounting bracket 524 otherwise functions identically to mounting bracket 324 of the previous embodiment.

Referring to FIGS. 30-33, a mounting bracket of another embodiment is generally indicated at 624. The mounting bracket 624 is securable to the interior surface 15 of the housing 12 for releasably attaching a driver to the mounting bracket to retain the driver in the housing 12. The mounting bracket 624 is substantially identical to mounting bracket 324 except that each flange 628 of the mounting bracket has a slightly different configuration. In particular, each flange 628 includes a first portion 640 extending from the base member 626. The first portion includes a bend 642 that extends directly from an edge 634 of the base member 426 and curves out of plane from the base member such that a planar section 644 of the first portion extends generally orthogonally to the base member. A second portion 646 of each flange 628 extends from the first portion 640. The second portion 646 includes a bend extending directly from the first portion 640, and a planar section extending from the bend. The bend curves downward and toward from the base member 626 such that the planar section of the second portion extends generally downward and toward from the base member. In one embodiment, the second portion 646 extends inward at about a 60-70 degree angle. A third portion 654 of each flange 628 extends directly from the second portion 646. The third portion 654 includes a bend extending directly from the second portion 646, and a planar section extending from the bend. The bend curves upward such that the planar section of the third portion 654 extends generally toward the base member 626. The third portions 654 defines a clamp for engaging the driver to hold the driver in the mounting bracket 624. The mounting bracket 624 otherwise functions identically to mounting bracket 324 of the previous embodiment.

Having described the disclosure in detail, it will be apparent that modifications and variations are possible without departing from the scope of the disclosure defined in the appended claims.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the compositions without departing from the scope of the disclosure, it is intended that all matter contained in the above description shall be interpreted as illustrative and not in a limiting sense.

What is claimed is:

1. A mounting bracket for mounting a driver to a housing of a luminaire, the mounting bracket comprising:
    a base member configured for attaching the mounting bracket to the housing of the luminaire;
    a pair of flanges extending laterally from the base member, each flange defining a clamp portion for engaging the driver to releasably attach the driver to the mounting bracket for mounting the driver to the housing of the luminaire; and
    a catch separate from the clamp portions and extending laterally from one of the flanges, the catch defining a planar surface configured to oppose a bottom of the driver when the driver is attached to the mounting bracket to retain the driver to the mounting bracket and a curved surface extending downward from the planar surface to one of the flanges, said one of the flanges extending downward from the curved surface and continuously from above the catch to below the catch.

2. The mounting bracket of claim 1, wherein the flanges are disposed on opposite sides or ends of the base member.

3. The mounting bracket of claim 1, wherein each flange extends orthogonally from the base member.

4. The mounting bracket of claim 1, wherein the catch is punched from said one of the flanges.

5. The mounting bracket of claim 1, further comprising tabs projecting from the base member, the tabs defining fastener holes for receiving fasteners for attaching the mounting bracket to the housing, wherein the base member defines an engagement surface for engaging the housing when the mounting bracket is attached to the housing, and wherein the tabs define contact surfaces for engaging the housing when the mounting bracket is attached to the housing, the engagement surface and contact surfaces extending within a common plane.

6. The mounting bracket of claim 1, wherein each flange includes a first portion extending directly from the base member and a second portion extending from the first portion at an angle.

7. The mounting bracket of claim 6, wherein each flange includes a third portion extending from the second portion at an angle.

8. The mounting bracket of claim 1 in combination with the driver.

9. The mounting bracket of claim 1, wherein the catch comprises a first catch, the mounting bracket further comprising a second catch extending laterally from the other of the flanges, the second catch defining a second planar surface configured to oppose the bottom of the driver when the driver is attached to the mounting bracket to retain the driver to the mounting bracket and a second curved surface extending downward from the second planar surface to the other of the flanges, said other of the flanges extending downward from the second curved surface and continuously from above the second catch to below the second catch.

10. The mounting bracket of claim 1, further comprising projections extending laterally from the base member, the projections configured to oppose sides of the driver when the driver is attached to the mounting bracket.

11. The mounting bracket of claim 1, wherein the mounting bracket restricts movement of the driver in 12 degrees of freedom when the driver is attached the mounting bracket.

12. A mounting bracket for mounting a driver to a housing of a luminaire, the mounting bracket comprising:
    a base member configured for attaching the mounting bracket to the housing of the luminaire;
    a pair of flanges extending laterally from the base member, the flanges each defining a clamp portion configuring the flanges for friction-fit engagement with the driver to releasably attach the driver to the mounting bracket for mounting the driver to the housing of the luminaire; and
    a catch separate from the clamp portions extending laterally from one of the flanges, the catch defining a planar surface configured to oppose a bottom of the driver when the driver is attached to the mounting bracket to retain the driver to the mounting bracket and a curved surface extending downward from the planar surface to one of the flanges, said one of the flanges extending downward from the curved surface and continuously from above the catch to below the catch.

13. The mounting bracket of claim 12, further comprising projections extending laterally from the base member, the projections are configured to oppose sides of the driver when the driver is attached to the mounting bracket.

14. The mounting bracket of claim 12, wherein each flange includes a first portion extending directly from the base member and a second portion extending from the first portion at an angle.

15. The mounting bracket of claim 14, wherein each flange includes a third portion extending from the second portion at an angle.

16. The mounting bracket of claim 12, wherein the mounting bracket restricts movement of the driver in 12 degrees of freedom when the driver is attached the mounting bracket.

17. A driver assembly for use in a luminaire, the driver assembly comprising:
    a mounting bracket including a base member configured for attaching the mounting bracket to a housing of the luminaire, a pair of flanges extending laterally from the base member, each flange defining a clamp portion and a catch separate from the clamp portion extending laterally from the flanges; and
    a driver releasably attached to the mounting bracket by friction-fit engagement with the flanges of the mounting bracket, the clamp portions engaging the driver to releasably attach the driver to the mounting bracket when the driver is attached to the mounting bracket, and the catches each defining a planar surface opposing a bottom of the driver when the driver is attached to the mounting bracket to retain the driver to the mounting bracket and a curved surface extending downward from the planar surface to one of the flanges, the flanges extending downward from the curved surfaces and continuously from above the catches to below the catches.

18. The driver assembly of claim 17, wherein the mounting bracket is formed from at least one of steel, spring steel, and aluminum.

\* \* \* \* \*